(12) United States Patent
McClellan

(10) Patent No.: US 7,044,340 B1
(45) Date of Patent: May 16, 2006

(54) APPARATUS AND METHOD FOR OPTIMALLY MIXING AND APPLYING A TWO PART EPOXY

(76) Inventor: Luther W. McClellan, 11359 Cadigan La., St. Louis, MO (US) 63137

( * ) Notice: Subject to any disclaimer, the term of this patent is extended or adjusted under 35 U.S.C. 154(b) by 183 days.

(21) Appl. No.: 10/608,834

(22) Filed: Jun. 27, 2003

Related U.S. Application Data

(60) Provisional application No. 60/392,160, filed on Jun. 28, 2002.

(51) Int. Cl.
*B65D 88/054* (2006.01)
(52) U.S. Cl. .............. 222/318; 222/134; 222/253; 92/168; 105/215
(58) Field of Classification Search ........... 222/134, 222/145.1, 253, 318, 319, 372, 146.2, 146.5; 92/168; 105/215
See application file for complete search history.

(56) References Cited

U.S. PATENT DOCUMENTS 2,946,488 A * 7/1960 Kraft ..................... 222/134
3,067,987 A * 12/1962 Ballou et al. ............ 366/160.3
3,730,105 A * 5/1973 Holley .................... 105/72.2
3,926,345 A * 12/1975 Pulk et al. ............... 222/145.7
4,228,924 A * 10/1980 Gilbert .................... 222/63
4,775,303 A * 10/1988 Liska ...................... 417/554
4,921,133 A * 5/1990 Roeser .................... 222/63
5,178,184 A * 1/1993 Skillman ................. 137/533.13
5,979,794 A * 11/1999 DeFillipi et al. ......... 239/135
6,217,300 B1 * 4/2001 Schuller et al. .......... 417/549

* cited by examiner

*Primary Examiner*—Gene Mancene
*Assistant Examiner*—Melvin A. Cartagena
(74) *Attorney, Agent, or Firm*—Kevin L. Klug

(57) ABSTRACT

An apparatus and method for mixing and injecting or applying a viscous material which is especially useful for mixing and applying a two part epoxy. The apparatus in its preferred form utilizes two uniformly heated holding tanks with auger feeds which each feed two synchronized variable ratio pumps having spring biased check valves which ensure positive closure of each valve. The apparatus further comprises a unique dispensing and mixing head which is fed from the synchronized pumps and serves to uniformly mix the viscous materials and dispense the aforesaid as a blend.

18 Claims, 28 Drawing Sheets

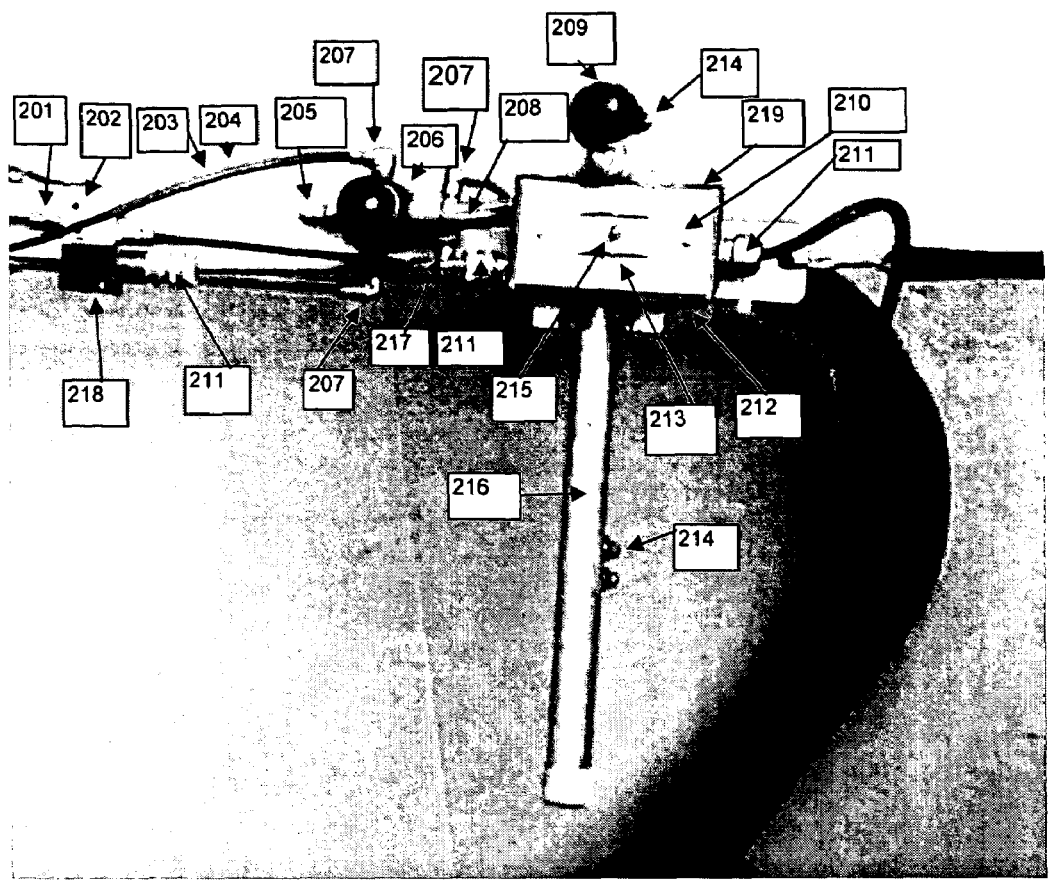

GUN CONTROLS

| REF# | DESCRIPTION |
|---|---|
| 201 | 1/8 M-NPT x 1/4 TUBING ADAPTER |
| 202 | MOUNTIG HARDWARE KIT |
|  | (2) 8/32 x 1 1/2 BOLT |
|  | (2) 8/32 NUTS |
|  | (2) #8 LOCKWASHERS |
| 203 | 1/4 TUBING |
| 204 | BACK PLATE |
| 205 | AIR MUFFLER |
| 206 | ELECTRIC AIR VALVE 12V (CYLINDER) |
| 207 | 1/4 M-NPT x 1/4 ADAPTER 90 |
| 208 | 1/2 OFFSET |
| 209 | HANDLE END (2) HOLE |
| 210 | COVER PLATE |
| 211 | CORD ADAPTER |
| 212 | ELECTRIC BOX |
| 213 | SWITCH GUARD |
| 214 | CONTACT BUTTON |
| 215 | 3 WAY SWITCH |
| 216 | HANDLE |
| 217 | 1/4 SIDE SERVICE TEE |
| 218 | ELECTRIC AIR VALVE 12V (BLOWER) |
| 219 | 1/4 x 1 1/4 BOLT ( IN JUCTION BOX) |
| 219 | 1/4 NUTS (IN JUCTION BOX) |
| 219 | 1/4 LOCK WASHER (IN JUCTION BOX) |

FIGURE 17

APPARATUS AND METHOD FOR OPTIMALLY MIXING AND APPLYING A TWO PART EPOXY

This application claims priority of Provisional Patent Application No. 60/392,160, filed Jun. 28, 2002.

BACKGROUND OF THE INVENTION

The present invention relates in general to an apparatus and method for mixing and injecting or applying an epoxy or viscous blend and more particularly to an apparatus which is capable of repeatedly mixing, delivering, and injecting or applying a preprogrammed amount of highly viscous two or more part epoxy which may contain strengthening or reinforcement fibers. The present invention represents a system for optimal delivery of the epoxy blend including heated holding tanks with auger feeds, a variable ratio pump capable of pumping highly viscous epoxy resin and hardener, and a unique dispensing and mixing head which is utilized as a part of the system. The apparatus is capable of mixing and delivering a preprogrammed quantity of epoxy mix in a very short period of time.

Epoxy is a common compound usually comprised of a hardener or curing agent and a resin which is often used as an adhesive and also to fill or seal gaps, holes, or cavities within a structure. Often, a fibrous reinforcing material is added to the blend to improve strength and durability. It has found wide use within the industrial, residential, and commercial sectors. One of the many industrial uses for epoxy includes the filling of holes or cavities in railroad ties and more particularly the filling of voids in railroad ties caused by rail seat abrasion. Rail seat abrasion represents an erosion or wearing of the railroad tie at the interface between the railroad rail and the tie. This phenomena is especially true for concrete railroad ties. That is, the movement of the railroad rail on the concrete tie during use causes a groove to wear into the tie. Stability of the rail necessitates repair of the groove by filling said groove with a strong and environmentally durable material. Typically, an epoxy and fiber mixture is placed into said groove and a rubber pad is placed between the rail and said epoxy mixture for complete repair and filling of said rail seat abrasion.

To date, large scale use of an epoxy resin as aforementioned has been difficult due to the highly viscous nature of said epoxy and the difficulty of feeding fibers with the epoxy. That is, a highly viscous material is difficult to pump, feed, mix, and deliver in a short amount of time and further presents difficulties controlling the exact ratio of mixture delivered. Furthermore, when fibers are added to the epoxy mixture, traditional feeding, valving, and mixing mechanisms tend to fail when the fibers accumulate and jam around said mechanisms.

As intimated, epoxy is formed from a highly viscous epoxy resin and a hardener typically mixed in a ratio of 1:0.5 to 1:2.0 respectively. Precise control of said mixing for such highly viscous materials is difficult due to unpredictable hose expansion and control of pump synchronization at the pressures necessary for delivery of the viscous epoxy. Prior to the art of the present invention, the mixing and delivering devices had a minimal amount of control over the quantity of resin and hardener delivered and were unreliable when fiber reinforcement material was added. With prior art devices, the user could not be assured that the same preprogrammed epoxy mixture amount could or would be delivered for every shot or use of the device. A further prior art problem is represented by the excessive amount of time which was necessary to deliver a preprogrammed amount of mixed epoxy. Ideally, the epoxy mixture should be delivered nearly instantaneously with the desired mixture of resin and hardener. Also, at the pressures necessary to flow such highly viscous materials, apparatus safety has continually been of concern.

The present art overcomes the aforementioned prior art limitations by providing an apparatus, system, and method for mixing, delivering, and injecting or applying a preprogrammed and repeatable amount of the aforementioned epoxy mixture in a short period of time from a dispensing or mixing head which delivers and mixes the epoxy. The present art utilizes uniquely heated storage and feed tanks for reducing the viscosity and improving cure time of the epoxy constituents and a unique variable ratio pump with spring loaded or biased suction and discharge port check valves to assure quick and repeatable delivery of the epoxy mixture. It further utilizes a unique combination of components which function reliably when a fiber reinforcement material is placed within said epoxy mixture.

Accordingly, it is an object of the present invention to provide a method, system, and apparatus for optimally mixing, injecting, or applying a two or more part epoxy which is capable of delivering a repeatable and programmed amount of epoxy into or onto a hole, cavity, or groove.

Another object of the present invention is to provide a method, system, and apparatus for optimally mixing and injecting a two part epoxy which is capable of mobility on railroad tracks and on railroad ties when a rail has been removed.

A further object of the present invention is to provide a method, system, and device for optimally mixing and injecting or applying a two part epoxy which delivers the epoxy mixture quickly.

A still further object of the present invention is to provide a dispensing or mixing head as an integral part of the present art apparatus which provides the aforementioned advantages and is designed to work in conjunction with the present art apparatus.

A yet further object of the present invention is to provide a unique method of thinning and feeding the constituent parts of the epoxy blend through the use of uniformly heated tanks having auger feeds.

A further object of the present invention is to provide a variable ratio dual pump mechanism capable of continuous pumping action in both extension and reflex with unique spring loaded or biased check valves in the suction and discharge ports of said mechanism for precise mixture control.

A further object of the present invention is to provide a method, system, and apparatus for optimally mixing and injecting or applying a highly viscous material which may contain fibrous material in a safe and reliable manner.

SUMMARY OF THE INVENTION

To accomplish the foregoing and other objects of this invention there is provided an apparatus and method for optimally mixing and applying a two part epoxy. In its preferred embodiment, the system comprises two or more heated holding tanks having auger feeds, one or more variable ratio pumps which are fed from the tanks, one or more mixing heads, and a timer/air valve apparatus which triggers the feeding of the mixing head. Some of the components of the present system and apparatus are commercially available and uniquely combined in such a fashion as to deliver the results described herein. The dispensing or mixing head assembly, which is typically mounted onto a frame, is a non commercially available apparatus which is specially designed to achieve the results described herein. The variable ratio pump with its spring loaded or biased check valves is also specially designed to achieve the results described herein. The mixing head in combination with the variable ratio pump and the heated auger feeding holding tanks, represent a unique and novel way of mixing and injecting a preprogrammed mixture of epoxy upon demand. The art of the present invention is uniquely capable of holding, feeding, and mixing an epoxy compound, including epoxy compound containing a fiber mixture for added strength.

The present art further incorporates a terrain drive on each side of the carriage, each having solid rubber tires. Each terrain drive may be lowered or raised via the action of a hydraulic cylinder. The terrain drives are driven by hydraulic motors and allow the carriage to be driven when the drives are lowered. The carriage further incorporates rail followers on each side of the carriage center axis which may be lowered onto a railroad rail and follow said rail when the terrain drives are moving the carriage. A unique feature of the present apparatus is the placement of a rail follower near the center axis of the machine whereby the carriage and apparatus may be guided by a railroad rail mounted on or near the center of the railroad track plane.

The art of the present invention may be manufactured from a variety of materials provided that said materials do not adversely react with the epoxy compounds or are properly coated to prevent such a reaction. Said materials include but are not limited to various metals and their alloys, woods, rubbers, plastics, or composites as required by the application. When disclosure of a commercially available component is satisfactorily described to those skilled in the art by block representation, said component along with its description, operation, and function shall be represented by a block within the drawings included herein or described in such terms as would allow one skilled in the art to practice the present invention. Those components which are not available as a commercial component and which are unique to the present art shall be presented in the drawings included herein.

BRIEF DESCRIPTION OF THE DRAWINGS

Numerous other objects, features and advantages of the invention should now become apparent upon a reading of the following detailed description taken in conjunction with the accompanying drawings, in which:

FIG. 17 is a top perspective view of the mixing head frame with attached mixing head, handle, air spray hose, timer trigger switch, air spray switch, epoxy feed hoses, and electric pneumatic control valve.

DETAILED DESCRIPTION

Figure 1:
FIG. 1 is a front perspective view of an apparatus for optimally mixing and applying a two part epoxy mounted upon a carriage for transportation on railroad rails showing its unique method of use during a railroad tie filling application.
Figure 2:
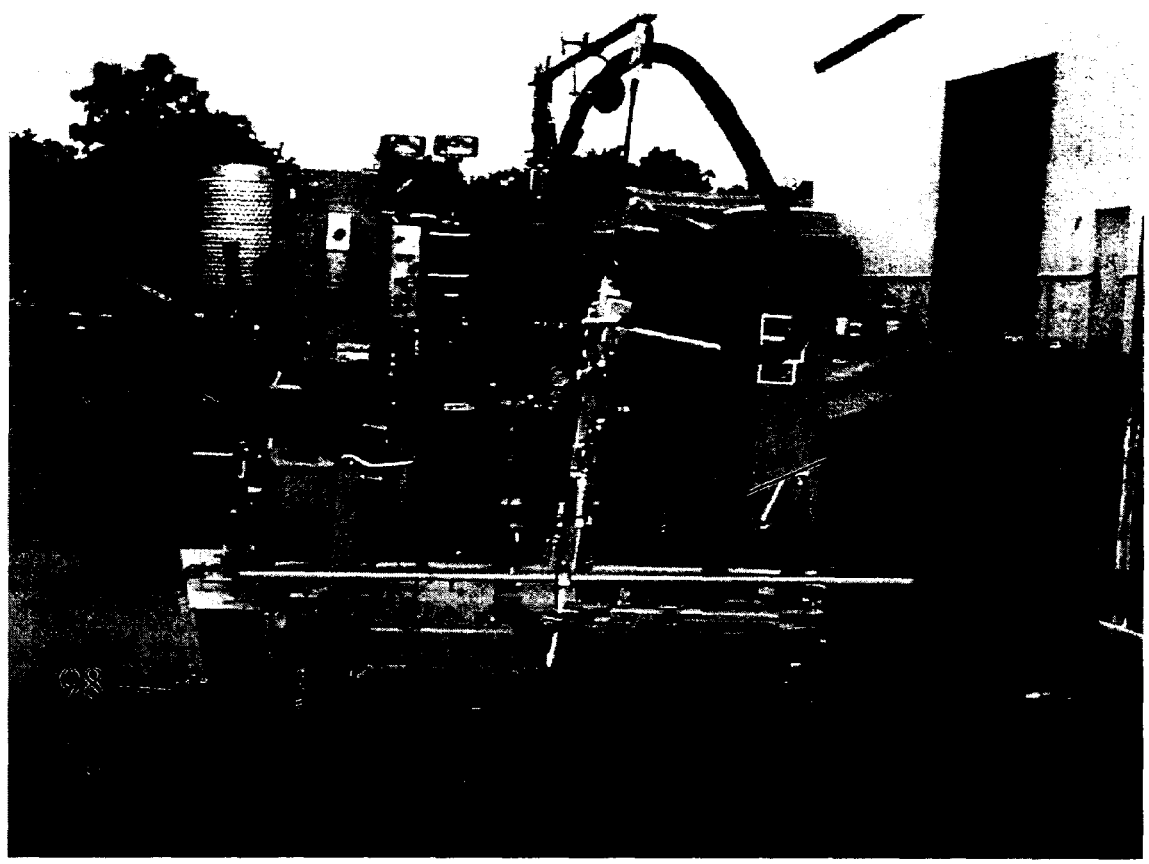
FIG. 2 is a front perspective view of an apparatus for optimally mixing and applying a two part epoxy showing the dispensing and mixing head assembly and applicator frame mounted upon a carriage for transportation on railroad rails.
Figure 3:
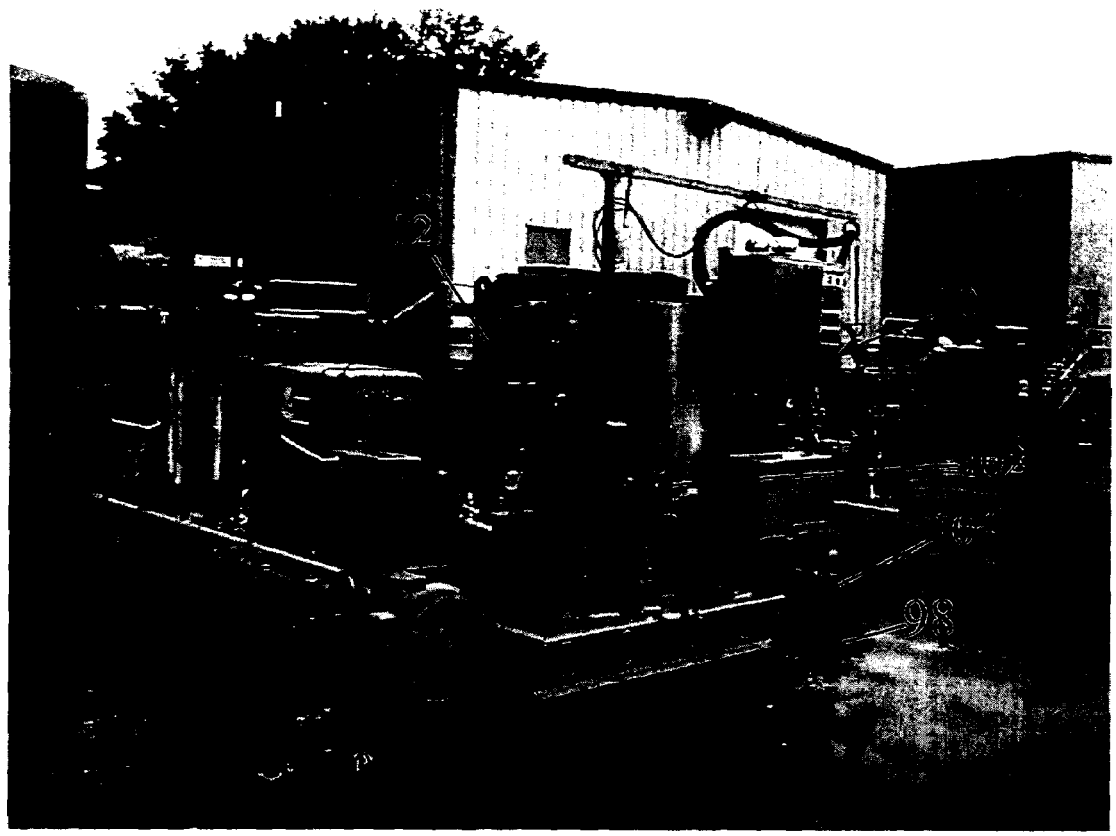
FIG. 3 is a left side perspective view of an apparatus for optimally mixing and applying a two part epoxy showing two heated holding tanks, hydraulic components, on board generator, and carriage for transportation on railroad rails.
Figure 4:
FIG. 4 is a right side perspective view of an apparatus for optimally mixing and applying a two part epoxy showing a heated holding tank, hydraulic components, on board generator, terrain drive and carriage for transportation on railroad rails.
Figure 5:
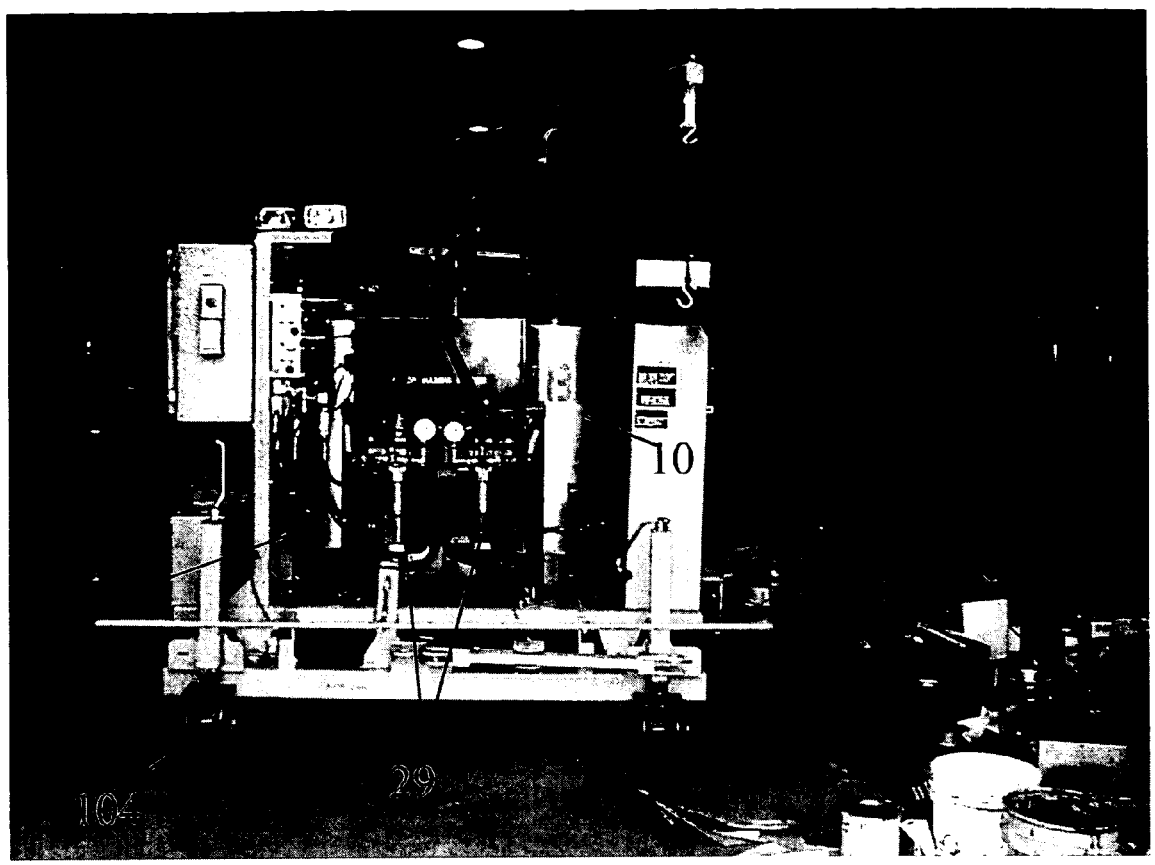
FIG. 5 is a front perspective view of an apparatus for optimally mixing and applying a two part epoxy showing two heated holding tanks and epoxy pumps all mounted upon a carriage for transportation on railroad rails.
Figure 6:
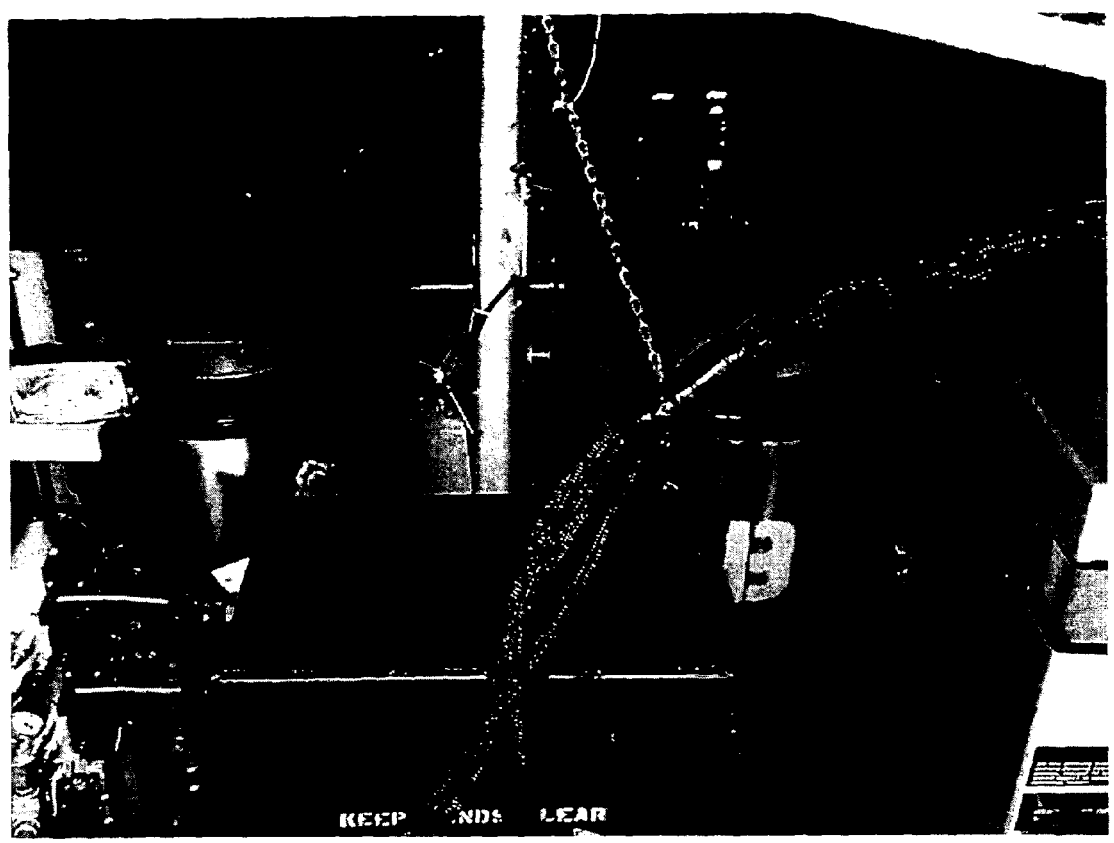
FIG. 6 is a top front perspective view of an apparatus for optimally mixing and applying a two part epoxy showing two heated holding tanks and epoxy hoses all mounted upon a carriage for transportation on railroad rails.
Figure 7:
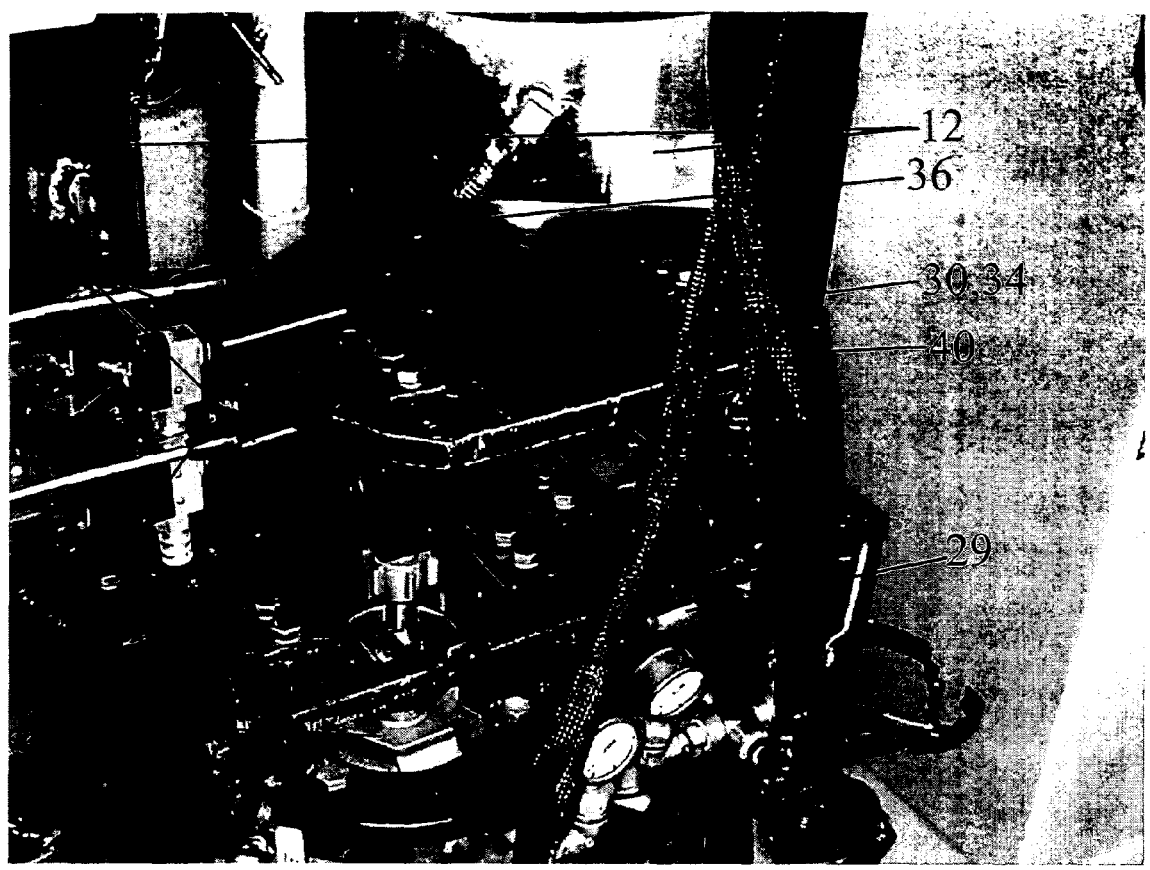
FIG. 7 is a top front perspective view of an apparatus for optimally mixing and applying a two part epoxy showing the pump mechanical linkage with a hinged plate having a groove or slot within said hinged plate with pinned or clevis type joints, a hydraulic drive cylinder on a first side of the hinge axis and two pumping pistons coupled onto the second side of the hinged axis, pump exiting hoses, limit switches triggered by the position of the hinged plate, pump/cylinder mounting bracket, and two heated holding tanks in the background.
Figure 8:
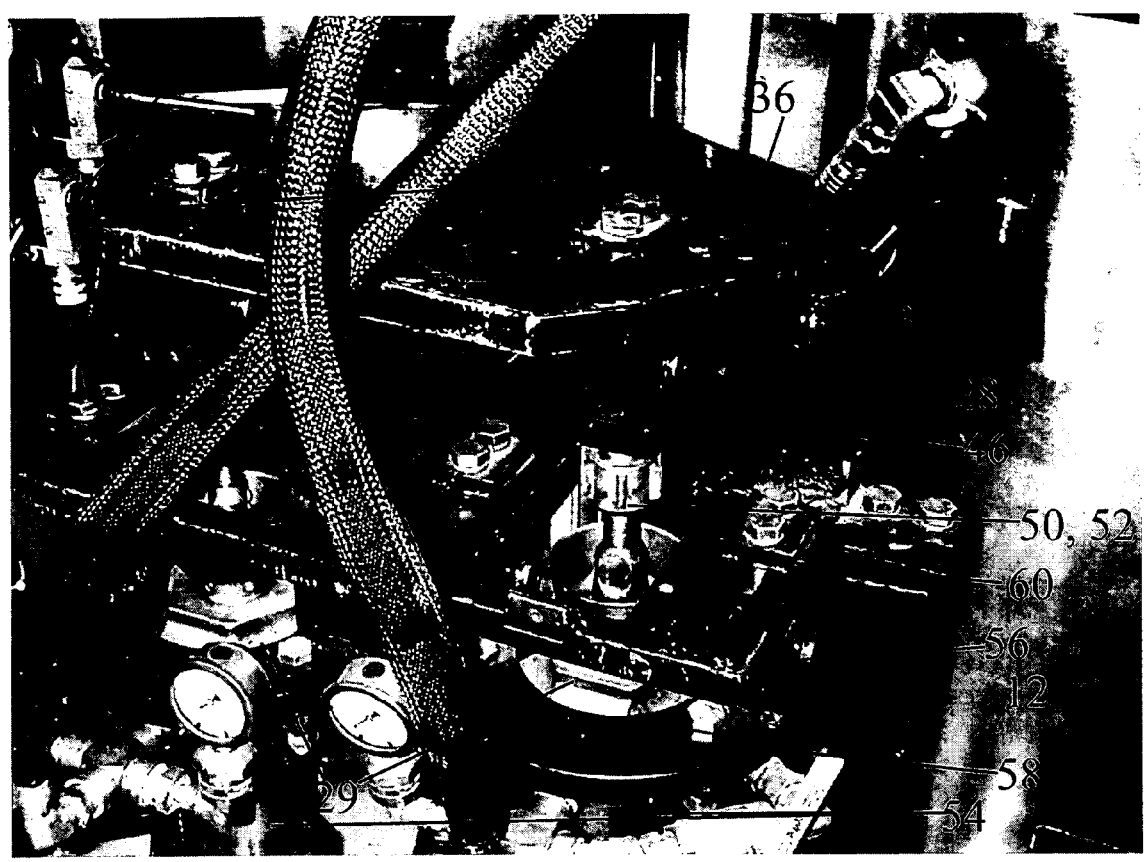
FIG. 8 is atop front perspective view of an apparatus for optimally mixing and applying a two part epoxy showing the same components as described in FIG. 7.
Figure 9:
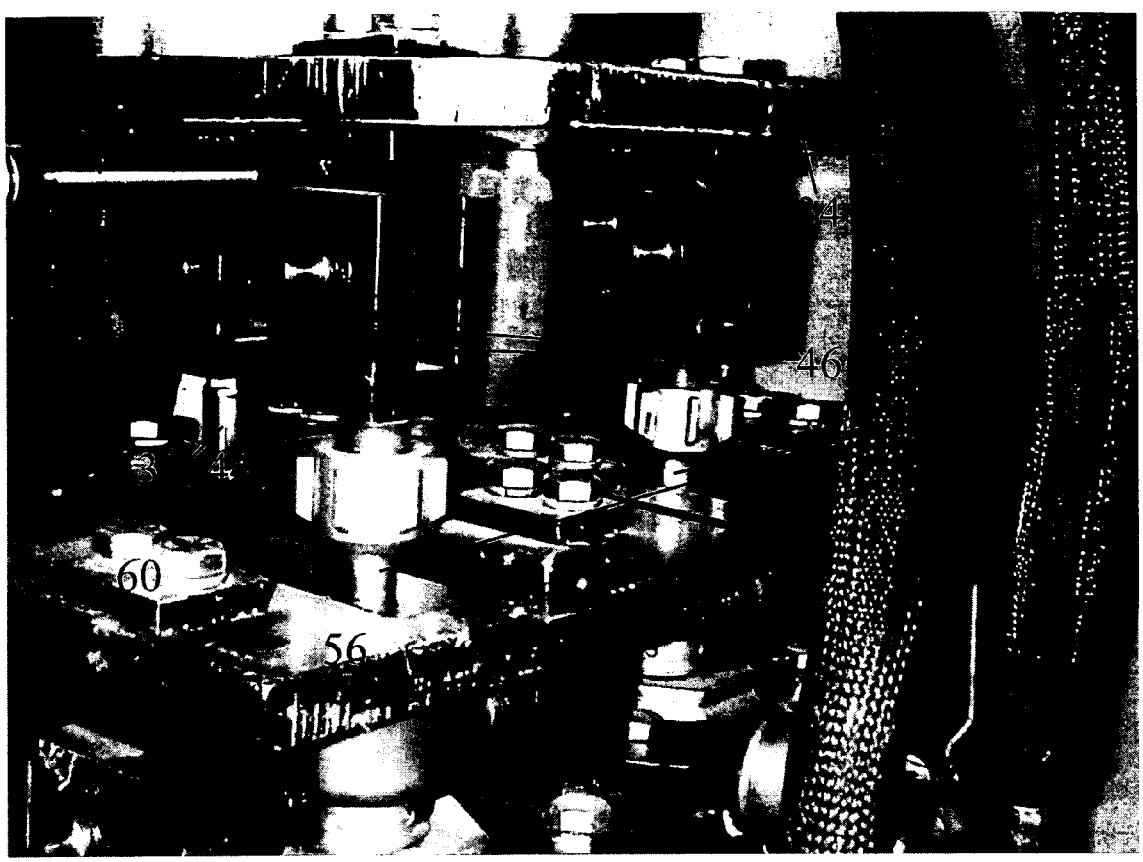
FIG. 9 is a front perspective view of an apparatus for optimally mixing and applying a two part epoxy showing a hinged plate having a groove or slot within said hinged plate with pinned or clevis type joints, two pumping pistons coupled onto the second side of the hinged axis, pump exiting hoses, pump/cylinder mounting bracket, and a limit switch triggered by the position of the hinged plate.
Figure 10:
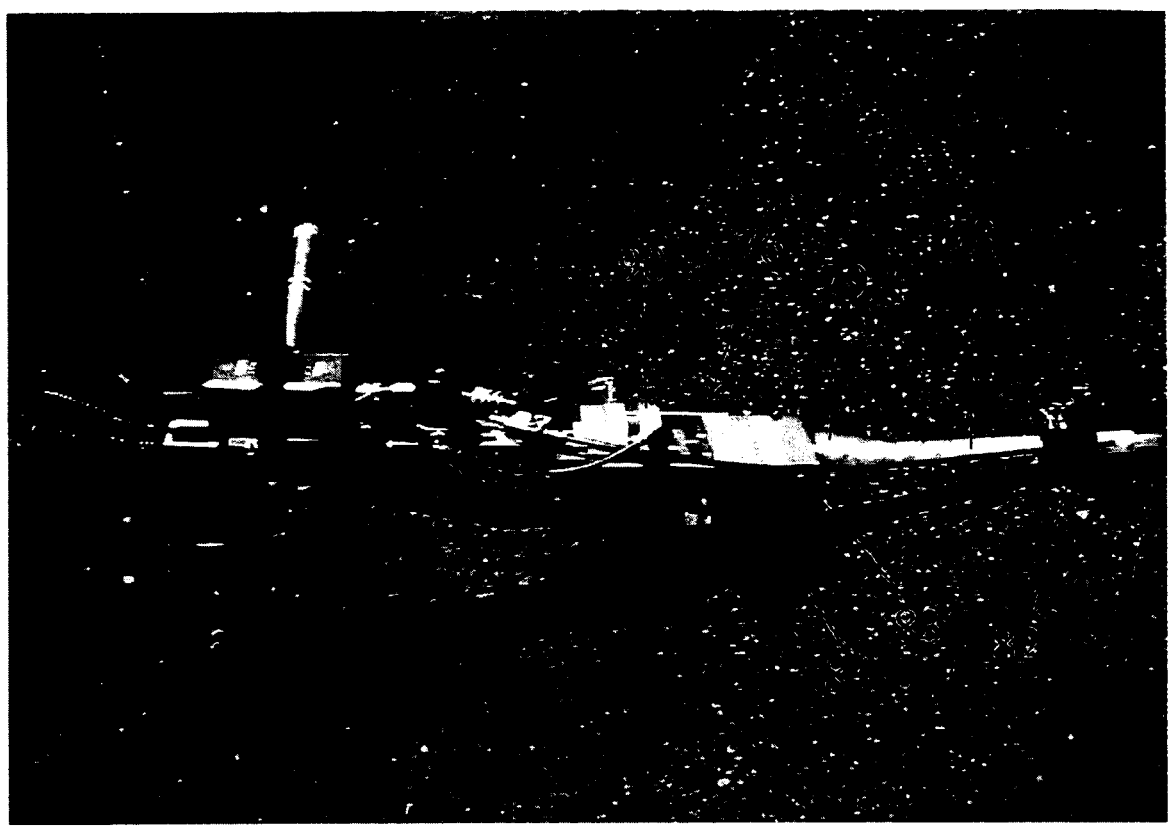
FIG. 10 is a left front perspective view of an apparatus for optimally mixing and applying a two part epoxy showing the mixing head frame with attached mixing head, handles, static mixer (far right), air spray hose and nozzle, timer trigger switch, air spray switch, epoxy feed hoses, mixing head pneumatic actuation cylinder, and electric pneumatic control valve. The topmost red switch controls the air discharge, the second to topmost red switch controls and activates the timer for epoxy mixture dispensing and the lower red switches control spontaneous forward and reverse direction drive on the terrain drives. The center toggle switch also provides continuous forward and reverse direction drive on the terrain drives when triggered.

Referring now to the drawings, there is shown in FIGS. 1–25 the apparatus for mixing and injecting or applying an epoxy blend 10 which provides for optimum mixing and delivery of a two or more part epoxy or viscous blend. The apparatus 10 is particularly adapted for use within the railroad industry and especially on railroad tracks or railroad ties when a rail has been removed. The apparatus 10 provides a quick and consistent delivery of an epoxy mixture blend.

The drawings show the apparatus 10 first comprising, in a preferred embodiment, two or more holding tanks 12. In a preferred embodiment, each holding tank 12 is used to hold either an epoxy resin or hardener. Typically the hardener is an amine curing agent material. In a preferred utilization of the present embodiments, the resin or hardener contains a plurality of fibers for added strength. More than two tanks 12 may be employed when the mixture requires more than two reactive agents without departing from the spirit or scope of the present art. The preferred embodiment incorporates a cavity 14 within the base and substantially surrounding each holding tank 12 into which is placed a heat transferring liquid 16 such as 50% ethylene glycol and 50% water mixture, or any other heat transferring liquid capable of heat transfer at the temperatures herein described. Heating elements 18, preferably electrically actuated, such as industry standard firerods or other heating elements 18 are inserted into said heat transferring liquid 16 or placed onto the cavity 14. As the liquid 16 heats, it uniformly transfers said heat to the resin or hardener, thereby reducing the viscosity of said materials. Without the heat transferring bath surrounding the resin, hot spots within the tank 12 tend to harden or scorch portions of the resin within the tank. An adjustable temperature sensor 20 monitors the liquid bath temperature and through the opening of relay contacts turns off the heating elements 18 when the resin or hardener reaches a desired temperature (typically 150° F.) which is below the selfhardening temperature (typically 175° F.). In addition to reducing viscosity, the heating action of the resin and hardener promotes the epoxy curing action when mixed. Alternative embodiments may forego incorporation of said heating elements 18 when the ambient conditions, compound reaction, and viscosity requirements allow.

Within the base of each holding tank 12 is an auger feeding system 22. Each auger feed 22 helps to recirculate the resin or hardener within its respective tank 12 and also assures a positive material feed which prevents cavitation (gassing) within the fed viscous material due to unusually high vacuum or suction. Due to the high viscosity of the constituent epoxy parts, suction feeding solely from said tanks 12 is not practicable. Without utilization of the auger 22, the unusually high suction necessary for extraction of a high viscosity liquid causes the material to cavitate or "gas off" which will then create vapor pockets within the material suction line. Also, the suction necessary to remove the resin or hardener from each tank 12 could cause the connection hoses to collapse, thereby limiting flow. In the preferred embodiments, an auger 22 is placed at the base of each tank 12 and rotated, preferably with a hydraulic or other type of motor 24, when the apparatus is operational. Each auger 22 feeds the exiting port 26 of each tank 12. Thus, as the auger 22 rotates, the highly viscous resin or hardener is fed toward the exiting port 26 of its respective tank 12 and also thoroughly mixed. The auger system 22 functions much as an agricultural grain auger feeds grain but instead uniquely feeds the highly viscous resin or hardener to the exiting port 26 of each tank 12, thereby reducing the suction head necessary to promote material flow. Although some of the aforementioned benefits may be achieved by pressurizing the holding tanks 12, the pressure necessary for feeding such a highly viscous material, especially when contained in a large tank, is unnecessarily hazardous to the persons using the equipment and further represents an explosion risk. The mixing action of the auger system 22 further assures a uniform temperature distribution within the viscous materials.

Each of the compounds to be mixed exit their respective tanks 12 into a variable ratio pump 28, typically through a hose which is not affected by the compound within. Each compound has its own pump 29, yet each pump 29 is synchronously coupled to the other pump(s) 29 to ensure an exact mixture of each compound. That is, each pump 29 provides a flow rate of material which is an unchanging multiple or fraction of the other pump(s) 29 in order to assure proper ratio mixing. In a preferred embodiment, the synchronous coupling is typically achieved via a mechanical linkage 30 between two or more pistons which are capable of providing exiting pressure on both the up (extension) and down (reflex or retraction) stroke. Typically said linkage 30/piston combination is actuated by a hydraulic cylinder drive 32 but may also be actuated by an electric motor, gear drive, or pneumatic means. Alternative embodiments may allow for said synchronous coupling through electronic control means. Said coupling ensures that the proper volume of each compound enters the mixing head at the same instant of time so that an exact mixing ratio is maintained.

The aforesaid pump mechanical linkage 30 is best described as a hinged plate 34 having a hydraulic drive cylinder 32 on a first side 36 of the hinge axis 38 and the pumping pistons coupled onto the other or second side 40 of the hinged axis 38. In the preferred embodiment, the hydraulic drive cylinder 32 is driven by a pressure controlled hydraulic pump. Said hydraulic drive cylinder 32 is pivotably secured to a bracket 42 and the extension rod 44 from said cylinder 32 is pivotably attached with a clevis 46 to said hinged plate 34. The controlled hydraulic pressure of the hydraulic drive cylinder 32 limits the maximum pressure within the pumping pistons 29. Within said second side 40 of the hinged plate 34 are two or more grooves or slots 48 into which pivotably mount the external ends 52 of the piston pump connecting rods 50. The grooves 48 are preferably placed substantially perpendicular with the hinge axis 38 of the hinged plate 34 thereby allowing the connecting rod 50 external ends 52 to be slideably placed and secured at a desired distance from the hinged axis 38. The closer a piston connecting rod 50 external end 52 is placed to the hinge axis 38, the smaller the ratio of connecting rod 50 displacement to hydraulic drive cylinder 32 displacement. Thus if $L_1$ represents the distance on the plate 34 from the hydraulic drive cylinder end 31 to the hinged axis 38, and $L_2$ represents the distance on the plate 34 from the first piston connecting rod 50 external end 52 to the hinged axis 38, and $d_1$ represents the linear displacement of the hydraulic drive 32, and $d_2$ represents the linear displacement of the first piston connecting rod 50, then in equation form:

$$d_2 = \frac{d_1}{L_1} * L_2$$

For a second piston where $L_3$ represents the distance on the plate 34 from the second piston connecting rod 50 external end 52 to the hinged axis 38 and $d_3$ represents the linear displacement of the connecting rod 50 for the second piston, then in equation form:

$$d_3 = \frac{d_1}{L_1} * L_3$$

Thus, from the foregoing, it can be seen that the ratio of $d_2/d_3$ is summarized as:

$$\frac{d_2}{d_3} = \frac{L_2}{L_3}$$

Since the volume of piston displacement is directly proportional to its connecting rod 50 stroke linear displacement, for equal diameter piston/cylinder pumps, the material ratio mixture provided by two piston pumps 29 is simply the ratio of lengths at which each connecting rod 50 end 52 is secured from the hinge axis 38, thereby providing the variable ratio pump 28.

Each external end 52 of each connecting rod 50 is preferably mounted to each groove or slot 48 within said hinged plate 34 with a pinned or clevis 46 type joint. The pinned joint frictionally bolts within said groove 48 yet allows the connecting rod 50 end 52 to pivot on a pin mounted within said clevis 46 as the hinged plate 34 pivots on its hinged axis 38. The cylinders 54 for each pump 29 are further mounted on a hinged cradle 56 comprised of a pump ring 58 attached to said cylinders 54 and pivotably secured to a mounting bracket 60. This hinging allows the cylinders 54 to pivot as the angle of the connecting rods 50 change with the hinged plate 34 movement. The pivoting action or motion of the pump cylinders 54 further helps the highly viscous material to flow.

Limit switches 62 are mounted near the hinged plate 34 in order to control the movement of the hydraulic drive cylinder 54. That is, when the pumps 29 or hydraulic drive cylinder 32 reach a maximum extension or reflex stroke, the hydraulic drive cylinder 32 movement must be reversed. Since the pumps 29 operate in both extension and reflex, reversal of the hydraulic drive cylinder 32 movement does not substantially affect the flow of the epoxy materials. The limit switches 62 are triggered by position of the hinged plate 34 and control an electric hydraulic valve which reverses the hydraulic pressure to the drive cylinder ports, thereby allowing the immediately prior drive port to drain into a hydraulic fluid reservoir and the newly or second pressurized drive port to supply pressure to drive the cylinder. Typically said limit switches 62 are electrical and control an electro-hydraulic valve, but alternative embodiments may utilize mechanical switches or valves which directly control the flow of the pressurized hydraulic fluid to said drive cylinder.

Although each pump 29 is a conventional piston and cylinder arrangement which is capable of positive pumping on both the extension and reflex stroke, typically a Graco model 1200 or model extreme, each is specially and uniquely modified with spring check valves 64, 65 to prevent reflux into the storage tanks 12 and assure positive and metered discharge. Due to the viscosity and/or fibers of the epoxy resins, conventional check valves do not positively close on the extension or reflex pump cycle. This causes a reflux into the storage tanks 12. When the check valves normally supplied with said Graco model 1200 are replaced with spring loaded check valves 64, 65 of the present art, the valve positively closes when required during the reflux and extension cycles. Alternative embodiments incorporate a hydraulically or pneumatically biased or controlled check valve.

Figure 11:
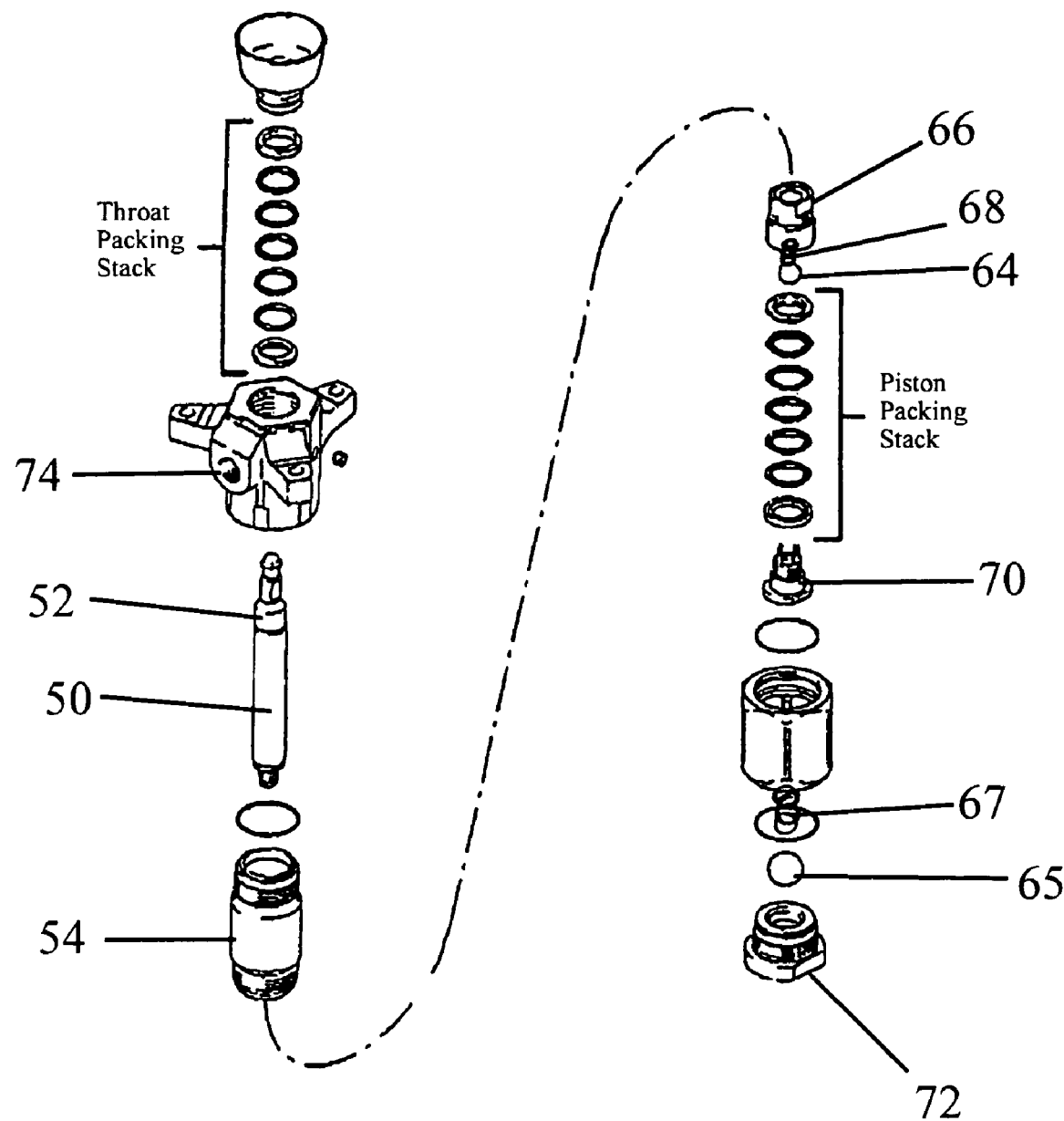
FIG. 11 is an exploded view of one of one of the pistons/cylinder pumps showing the connecting rod, discharge port, connecting rod packing and sealing materials, cylinder and its wall, piston, piston ball check valve with added spring bias, piston packing and sealing materials, piston ball check valve seat, intake port ball check valve, intake port ball check valve spring bias, and the intake port.
Figure 12:
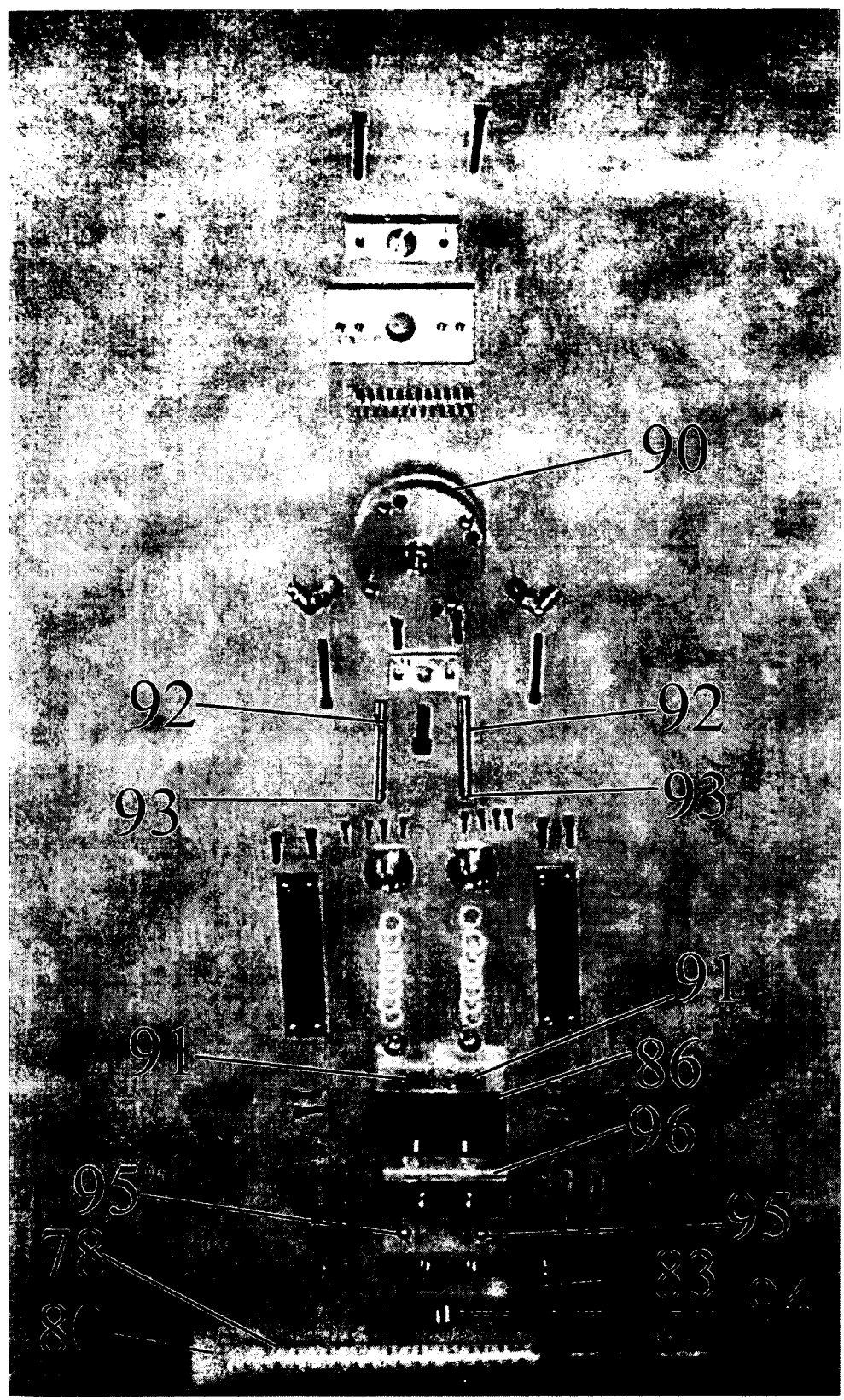
FIG. 12 is an exploded view of the dispensing and mixing head showing the static mixer, the mixing block, seal plate, valving block, compound pin valves, O-rings, packing, valve actuating air cylinder, and associated connecting and mounting hardware.

As seen in FIG. 11, each pump 29 comprises a connecting rod 50 attached to a piston 66 which operates within a cylinder 54. Each piston 66 has an included ball check valve 64 which is spring 68 biased or loaded onto a valve seat 70 which attaches with said piston 66. When the piston 66 is forced into the cylinder 54 towards the intake port 72 the ball check valve 64 opens and allows viscous liquid material flow through said piston 66 and into the area within the cylinder 54 where the connecting rod 50 attaches with said piston 66. Since the volume displaced in front of the moving piston 66 is greater than that volume defined to the rear of the piston 66 due to the volume taken by the connecting rod 50, liquid material flows out of the discharge port 74 when the piston 66 is forced into the cylinder 54 towards the intake port 72. As the piston 66 retracts away from the intake port 72 the piston check valve 64 stays closed, forces the liquid in the volume having the connecting rod 50 out the discharge port 74, and further causes the spring loaded intake check valve 65 with spring 67 bias to open and allow liquid material to enter the cylinder 54 from the intake port 72. The aforesaid, absent the spring bias/loading 67, 68 is typically found within a GRACO model 1200. Nevertheless, in order to function properly and assure positive check valve closure with a highly viscous liquid such as epoxy, the check valve springs 67, 68 must be added and are a unique part of the present invention. Prior art pumps such as the GRACO model 1200 have not solved the problem of check valve closure when pumping highly viscous liquids, especially when said liquids contain fibrous material.

Upon exiting from each pump 29, each epoxy constituent compound is fed into a separate "T" connection having an entrance and two exiting ports. A first exiting port of each "T" connection is connected with its own recirculating valve which allows recirculation into the respective holding tanks 12. The other "T" exiting port or second exiting port feeds the dispensing or mixing head 76 through a hose which is not affected by the compound within. When the recirculating valve is closed, the dispensing or mixing head 76 is pressurized and ready for use. Pressure of said epoxy compounds is controlled by the hydraulic pressure supplied by the hydraulic drive cylinder 32. Said dispensing or mixing head 76 allows for each of said compounds, with or without added fibers, to enter said head 76, thoroughly mix within a static mixer 78, and exit from said static mixer 78 nozzle into the groove, cavity, or worn area of choice.

When actuation and use of the dispensing or mixing head 76 is desired, the aforesaid recirculation valves in the recirculation hoses are closed, thereby preventing recirculation into the holding tanks 12 and providing maximum compound pressure into the dispensing or mixing head 76. Again, in a preferred embodiment, said pressure is controlled by the hydraulic pressure fed to the hydraulic drive cylinder 32. Upon actuation of said dispensing or mixing head 76 for a preprogrammed user determined amount of time, each of said epoxy compounds which enter said dispensing or mixing head 76 is allowed to enter a static mixer chamber portion 80 of said mixing head 76 and thereafter be ejected through a commercially available static mixer 78 into the area or volume in which said epoxy is required. An air spray or nozzle 82 is typically provided near or on said mixing head 76 to clean the area onto which the epoxy is applied. In a preferred embodiment, said air spray is manually controlled with an electro-pneumatic valve, but alternative embodiments may incorporate automatic air spray systems prior to epoxy mix application.

Referring to FIGS. 12–16, the mixing head 76 assembly, also known as the epoxy dispensing gun head or dispensing head assembly, is comprised of two or more compound entrance holes 84 on the valving block 86 which feed through to two or more mixture exiting holes 88 on the mixing head 76 and which further feed the static mixer 78. Said assembly is further comprised of two or more compound chambers 85 within the mixing head 76, a mixing chamber 79 which is comprised of said static mixer 78, a compound valve actuator 90, typically an electrically controlled pneumatic cylinder, and two or more compound valves 92, also typically known as needle or pin throttle valves slidably engaged and sealed within bores 91. In the preferred embodiment, the static mixer 78 is placed over said mixture exiting holes 88 via the use of an adaptor 94 which allows the static mixer 78 to be threadedly engaged over said exiting holes 88. Alternative embodiments may attach said static mixer 78 in any manner which allows epoxy components to flow and mix therethrough.

As further described herein, each component, chamber 85, passage, or compound valve 92 is sealed with the necessary seals, gaskets, O-rings, or interface to prevent leakage or unintended mixing of the constituent epoxy compounds. In combination with such, each compound entrance hole 84 provides for the entrance of each constituent compound through the valving block 86 and into the mixing head 76 and also into its respective compound chamber 85 without leakage. If said compound valves 92 are actuated by said valve actuator 90 when the recirculating valves are closed, each of said pressurized compounds are allowed to enter said mixing head 76 and each exit through its own mixture exiting hole 88 into said static mixer 78. The static mixer 78 is available commercially and is typically comprised of a tube having an internal interrupted helix path of flow which provides for a turbulent mixing flow of said mixed compounds. Although a preferred mixing head 76 embodiment incorporates needle or pin type valves which allow compound flow into said mixing chamber 79, alternative embodiments may incorporate other types of valves which when operated in synchronism or separately will allow compound flow into said mixing chamber 79 or static mixer 78.

In a preferred embodiment, the tips of said needle or pin valves 92, when closed, extend slightly into said compound chambers 85 in order to ensure that the bores 91 of said valves 92 remain clean and free from the materials within said mixing head 76. Said preferred embodiment further seals the tips 93 of the needle valves 92 with O-rings 95 which are preferably manufactured of TEFLON or another material which is not affected by the epoxy compounds. Said O-ring 95 seal ensures that epoxy does not enter the needle valve 92 body and cause it to stick. Furthermore, although a preferred embodiment allows for the actuation of said valves 92 with an electrically controlled pneumatic cylinder as a valve actuator 90, alternative embodiments may also provide for electric solenoidal, motor, or hydraulic control. The needle or pin type valves 92 of the aforementioned mixing head 76 provide reliable operation even if the epoxy mixture contains reinforcement fibers.

Figure 13:
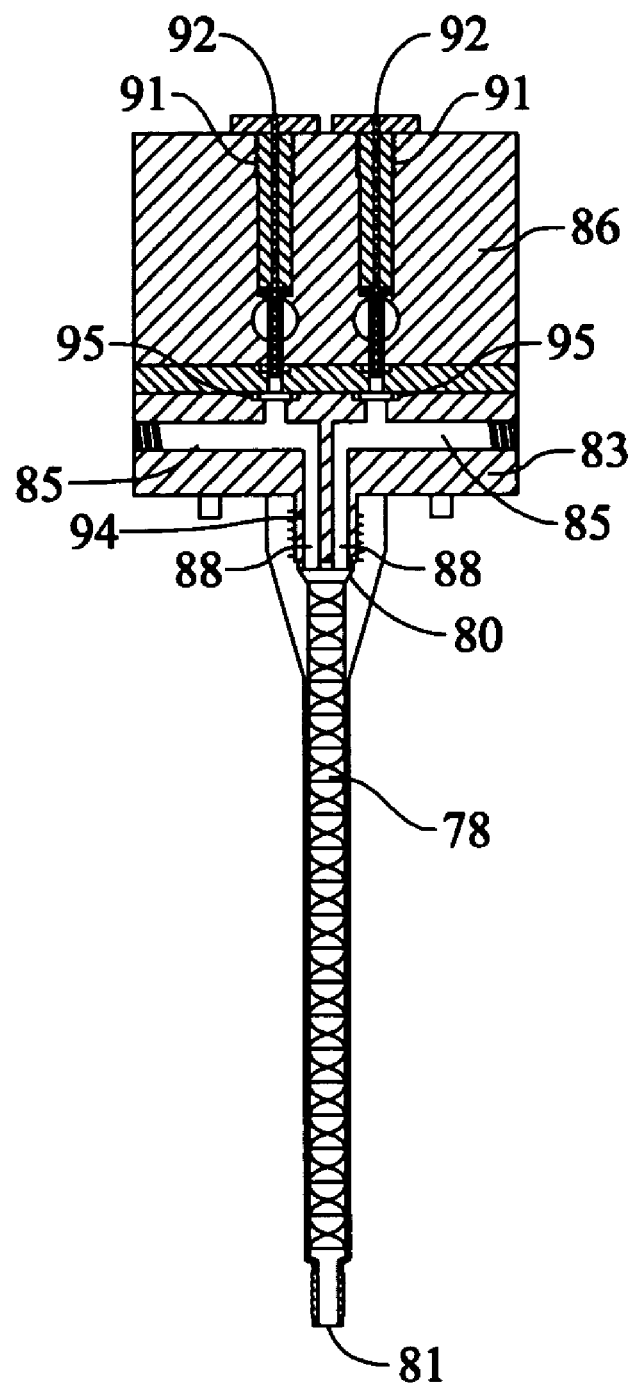
FIG. 13 shows a cross sectional view of the of the valving block, seal plate, mixing block, and static mixer of the epoxy dispensing gun head taken along a mid section plane parallel with the front face having the two or more compound entrance holes.
Figure 14:
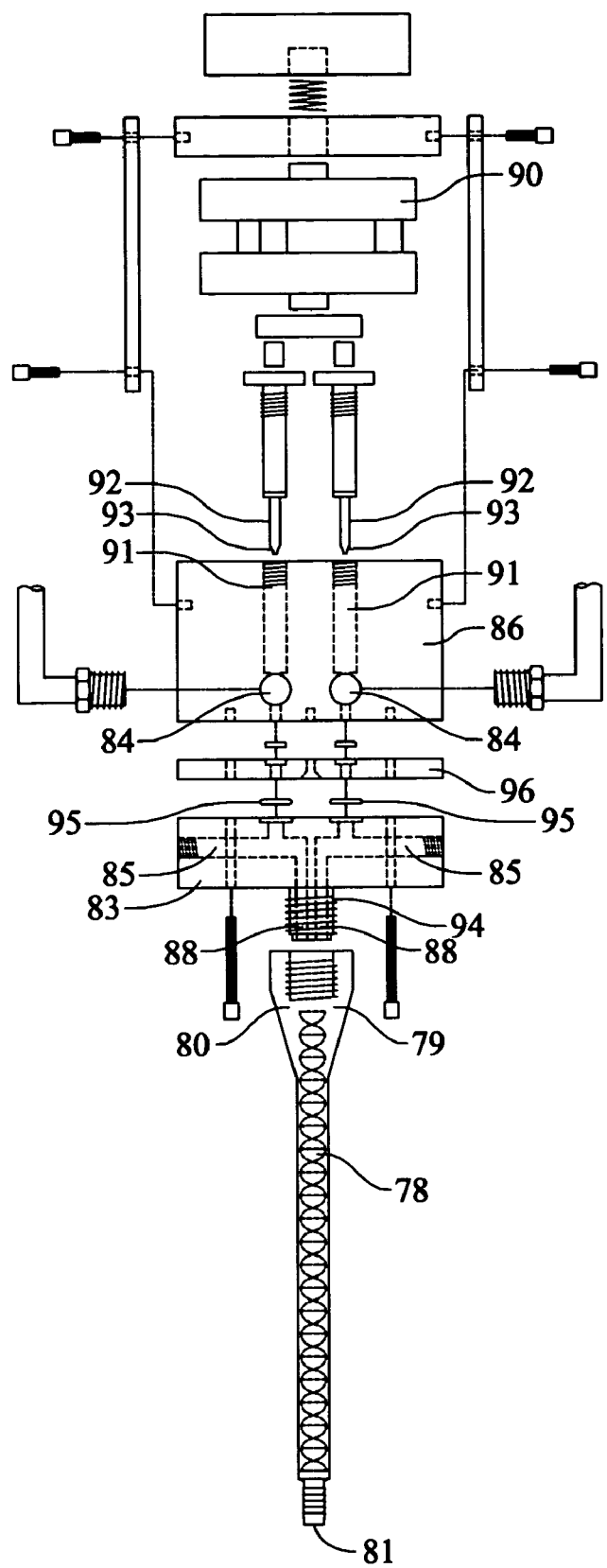
FIG. 14 shows an exploded assembly front view of the dispensing and mixing head including the seal plate which fits between the valving block and the mixing block with internal passages shown in phantom. Said seal plate providing for placement and securing of the valve tip O-rings.
Figure 15A:
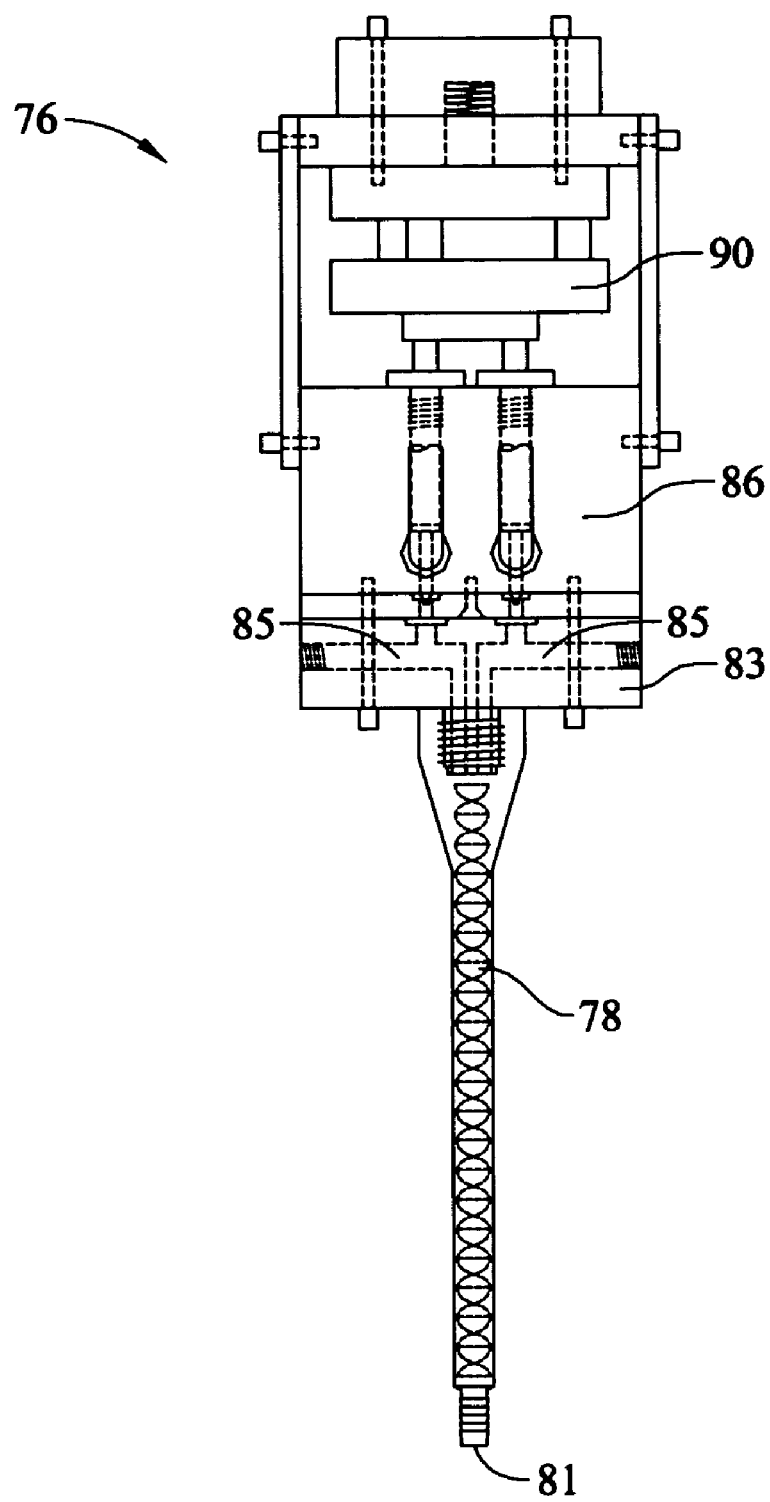
FIG. 15A shows a front view of the assembled dispensing head showing the separate epoxy feed ports and exiting holes and the adaptor for said static mixer with internal passages shown in phantom.
Figure 15B:
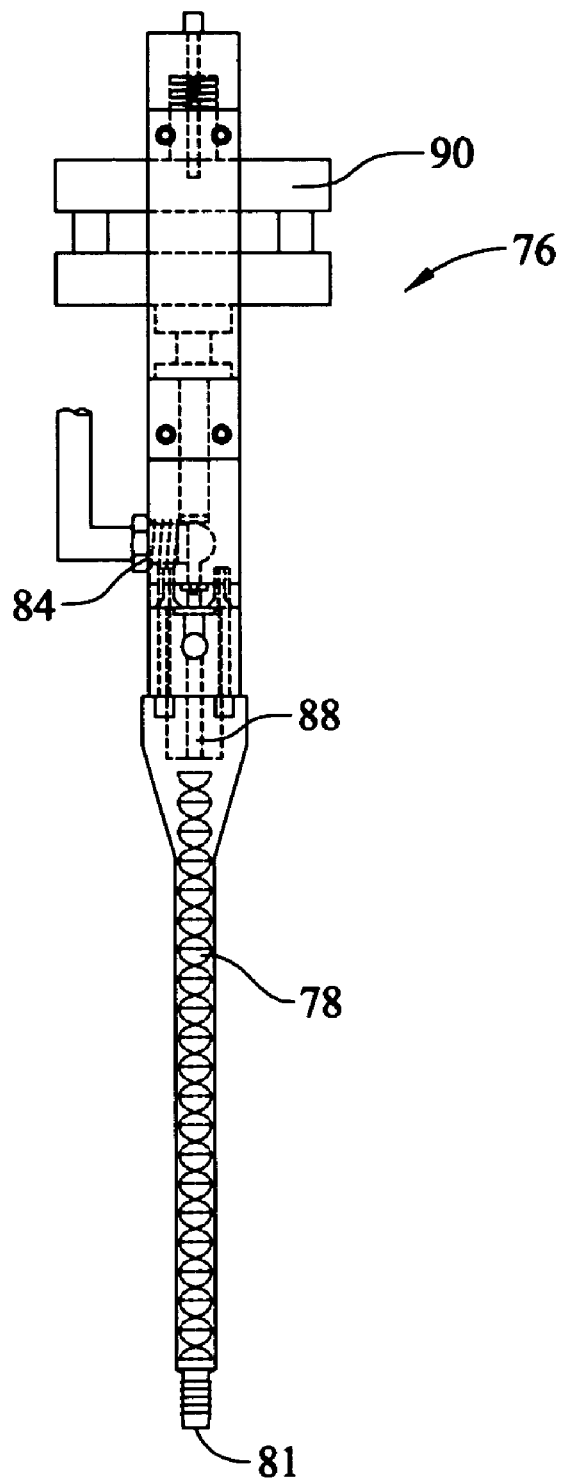
FIG. 15B shows a right side view of the assembled dispensing head showing the separate epoxy feed ports and exiting holes and the adaptor for said static mixer with internal passages shown in phantom.
Figure 16:
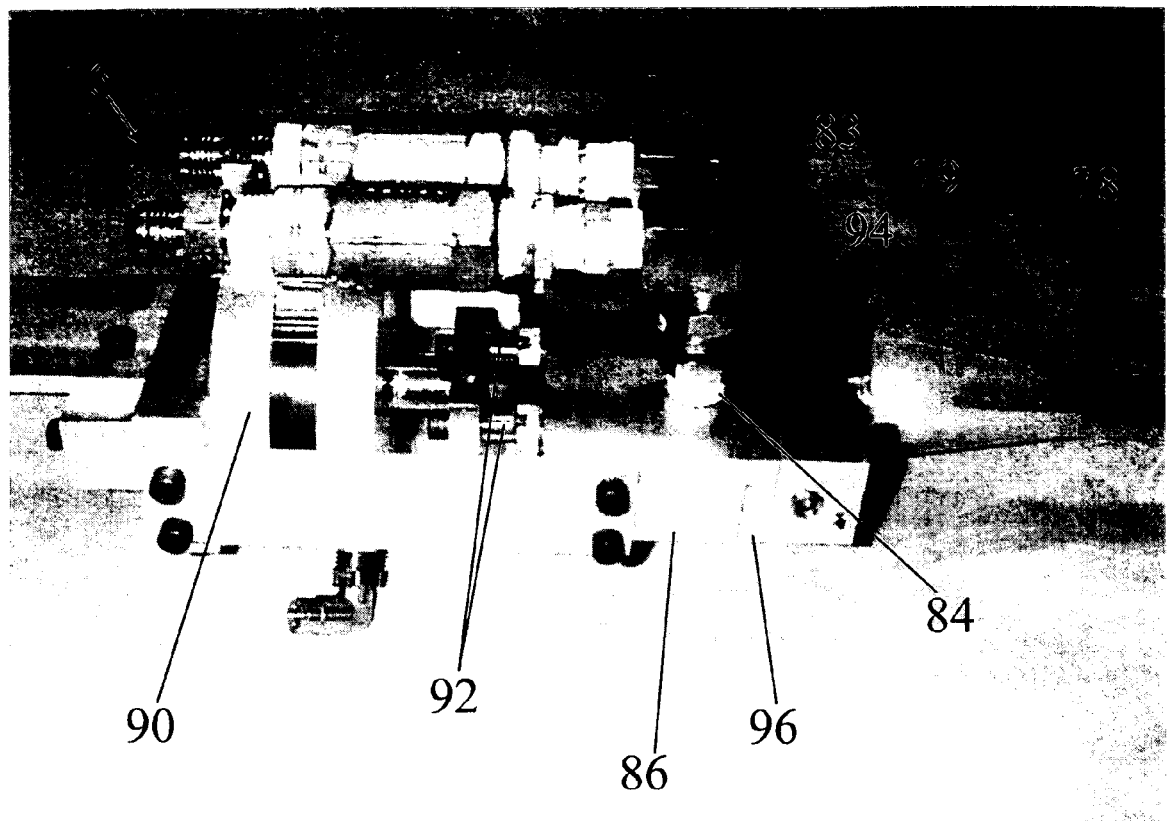
FIG. 16 shows a perspective view of the assembled dispensing gun head showing the static mixer, the mixing block, the valving block, valve actuating air cylinder, and associated connecting and mounting hardware.
Figure 18:
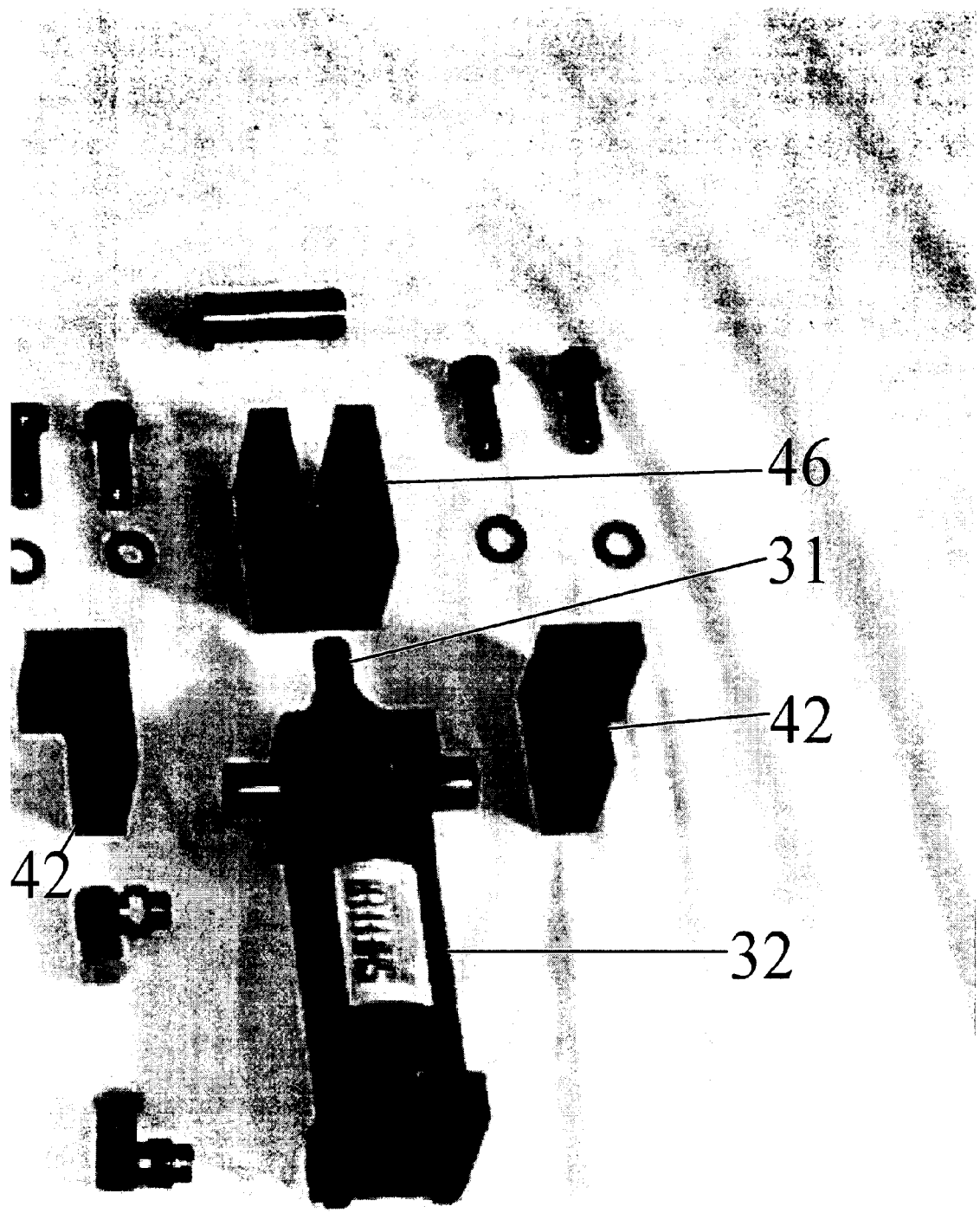
FIG. 18 is a perspective view of the hydraulic drive cylinder and its associated pivoting clevis and mounting hardware, showing the extension and reflux hydraulic fluid entrance/exit ports.
Figure 19:
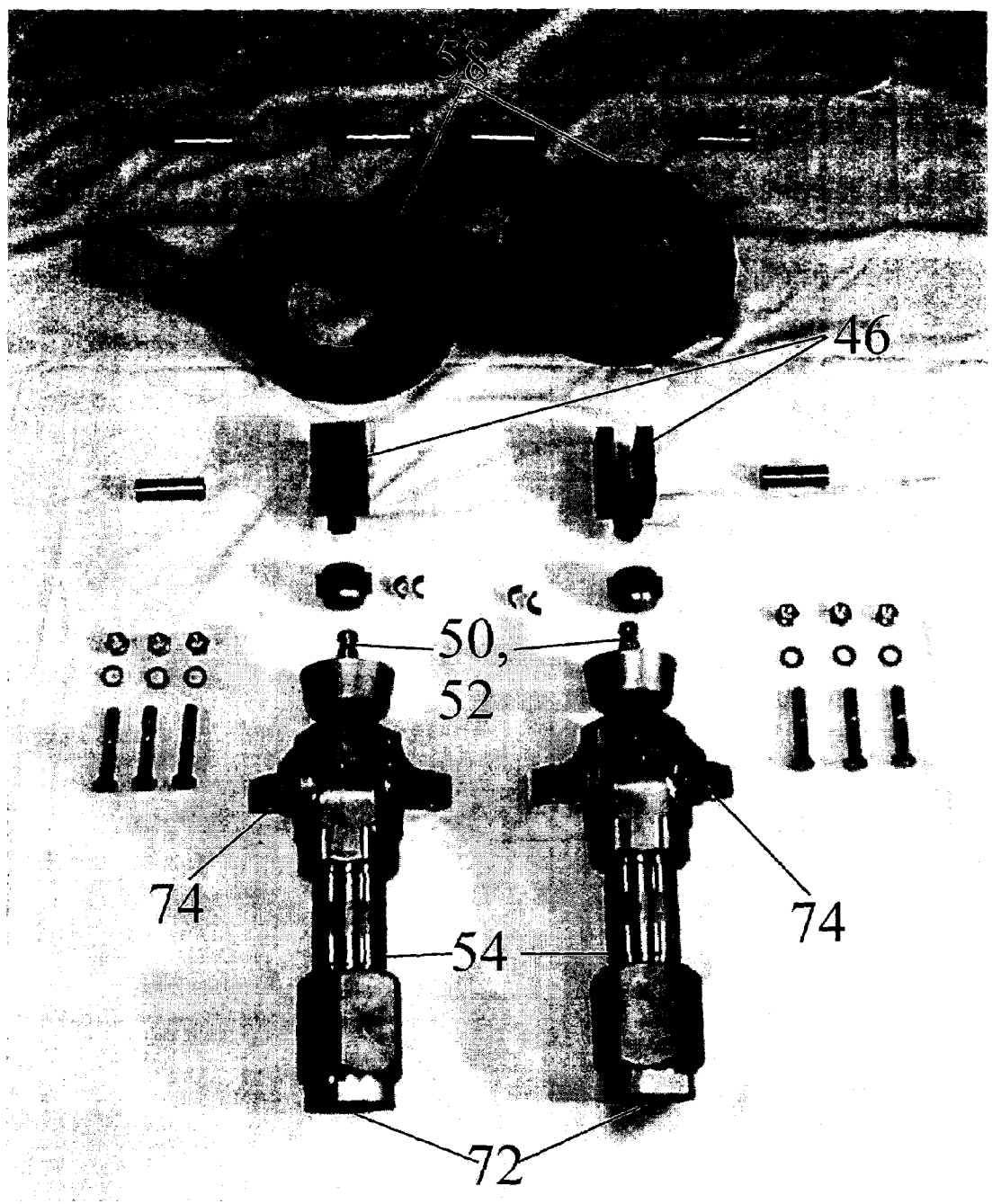
FIG. 19 is a perspective view of the pumps and associated mounting hardware, including piston coupling nuts, piston clevis, and pump rings. Said pump rings pivotably secure or cradle said pumps to a bracket which allows said pumps to pivot during operation.
Figure 20:
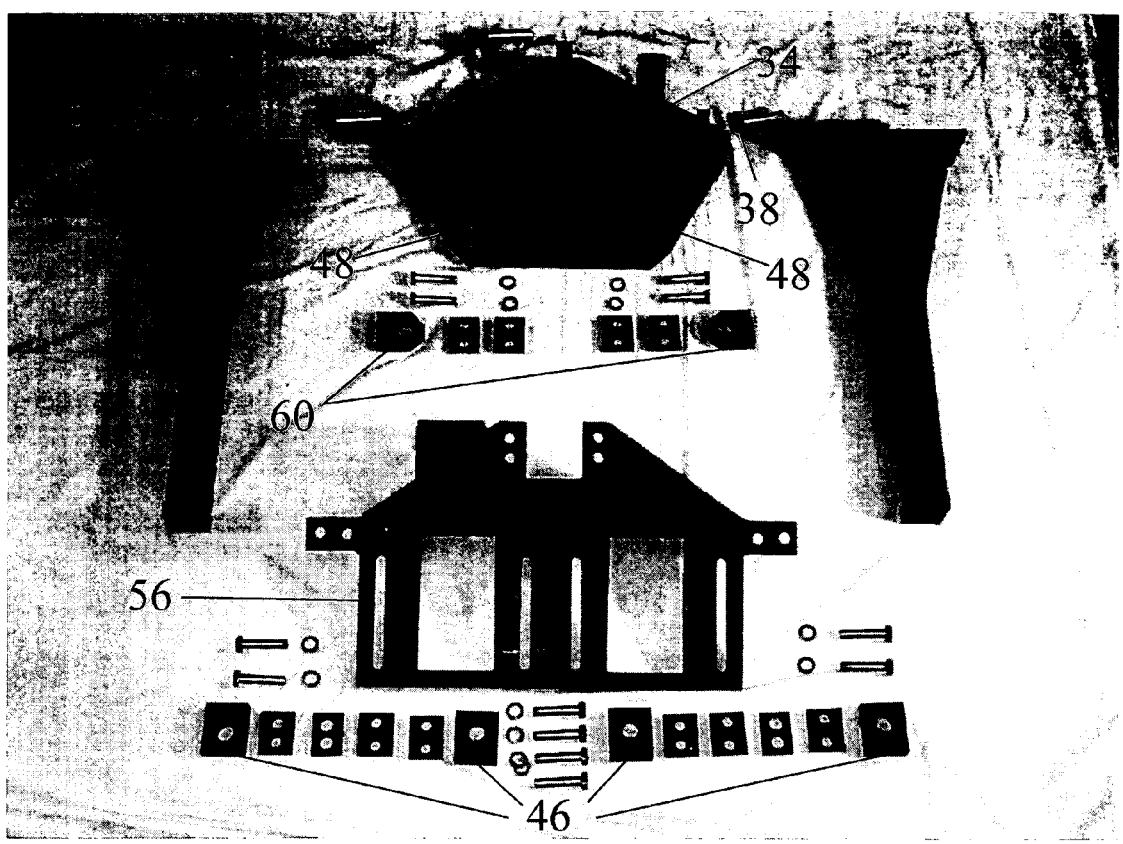
FIG. 20 is a perspective view of the pump and hydraulic cylinder frame showing the support legs, pump/hydraulic cylinder mounting bracket also known as a support base, the hinged plate also known as wobble plate, along with the clevis and other mounting hardware.
Figure 21:
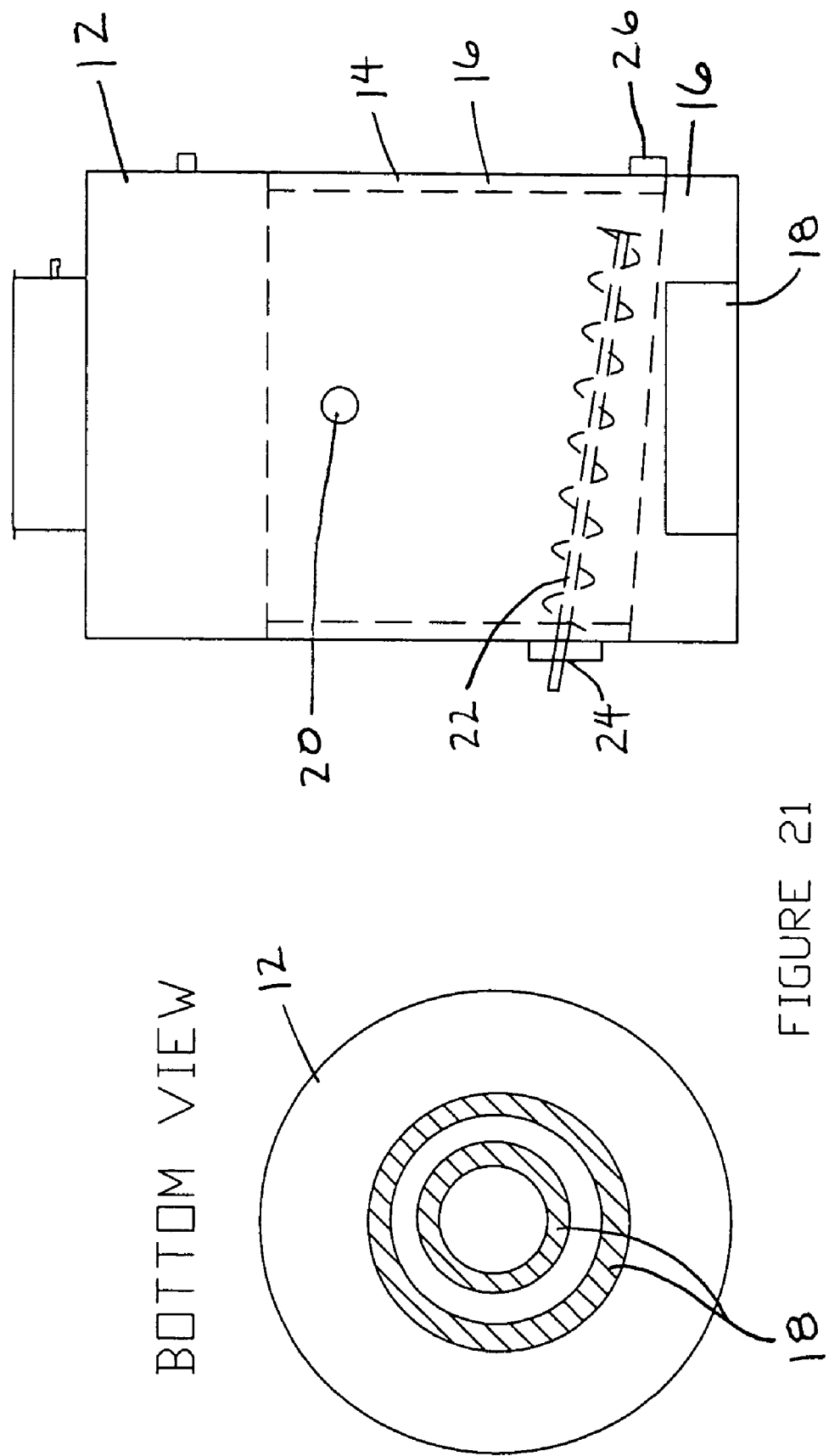
FIG. 21 is a right side plan view of a heated holding tank having an auger feed and cavity shown in phantom and further showing the exiting port and heating element placement.
Figure 22:
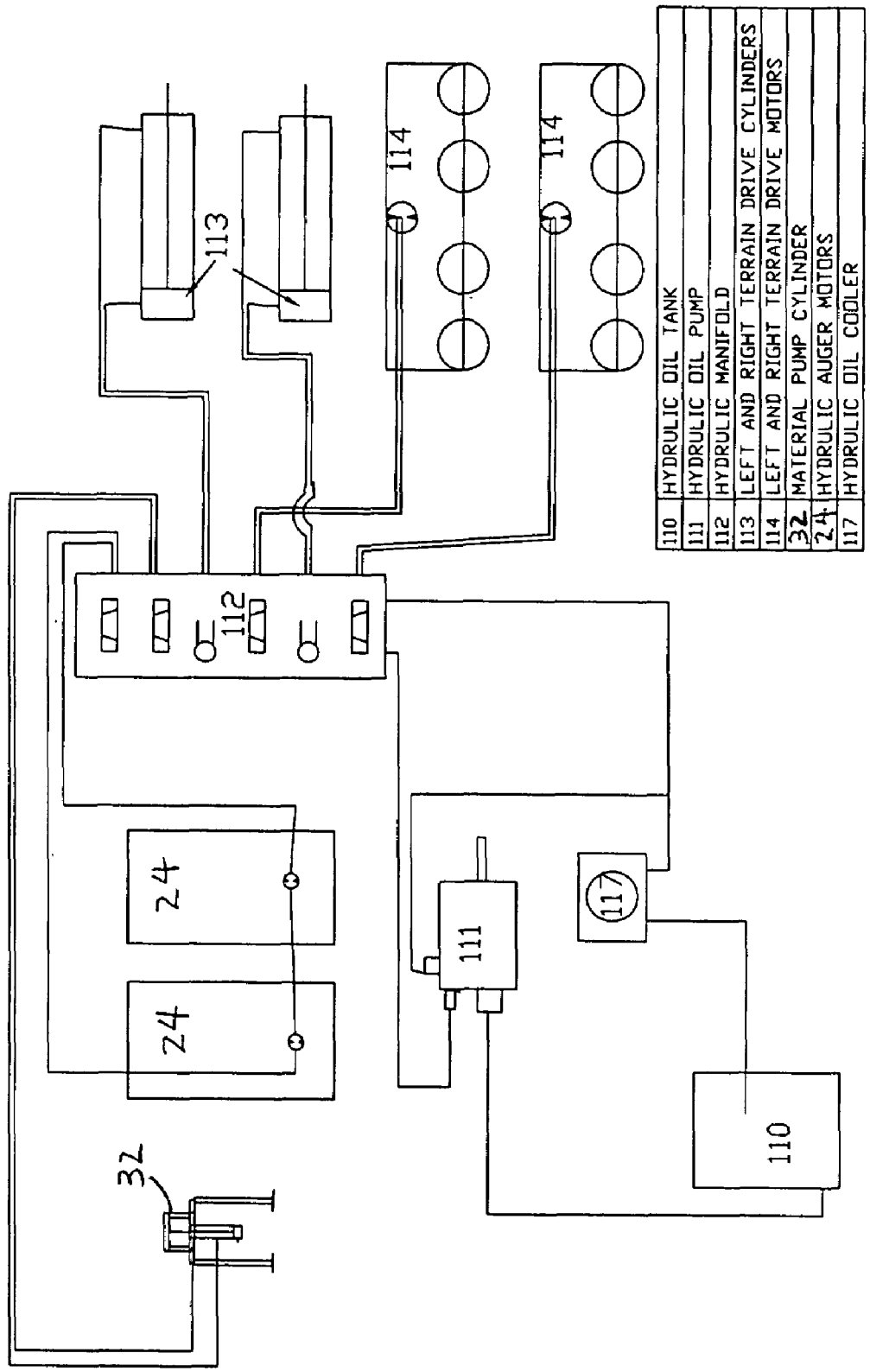
FIG. 22 is a schematic diagram of the hydraulic flow within the apparatus with attached descriptions of the numerically identified components.
Figure 23:
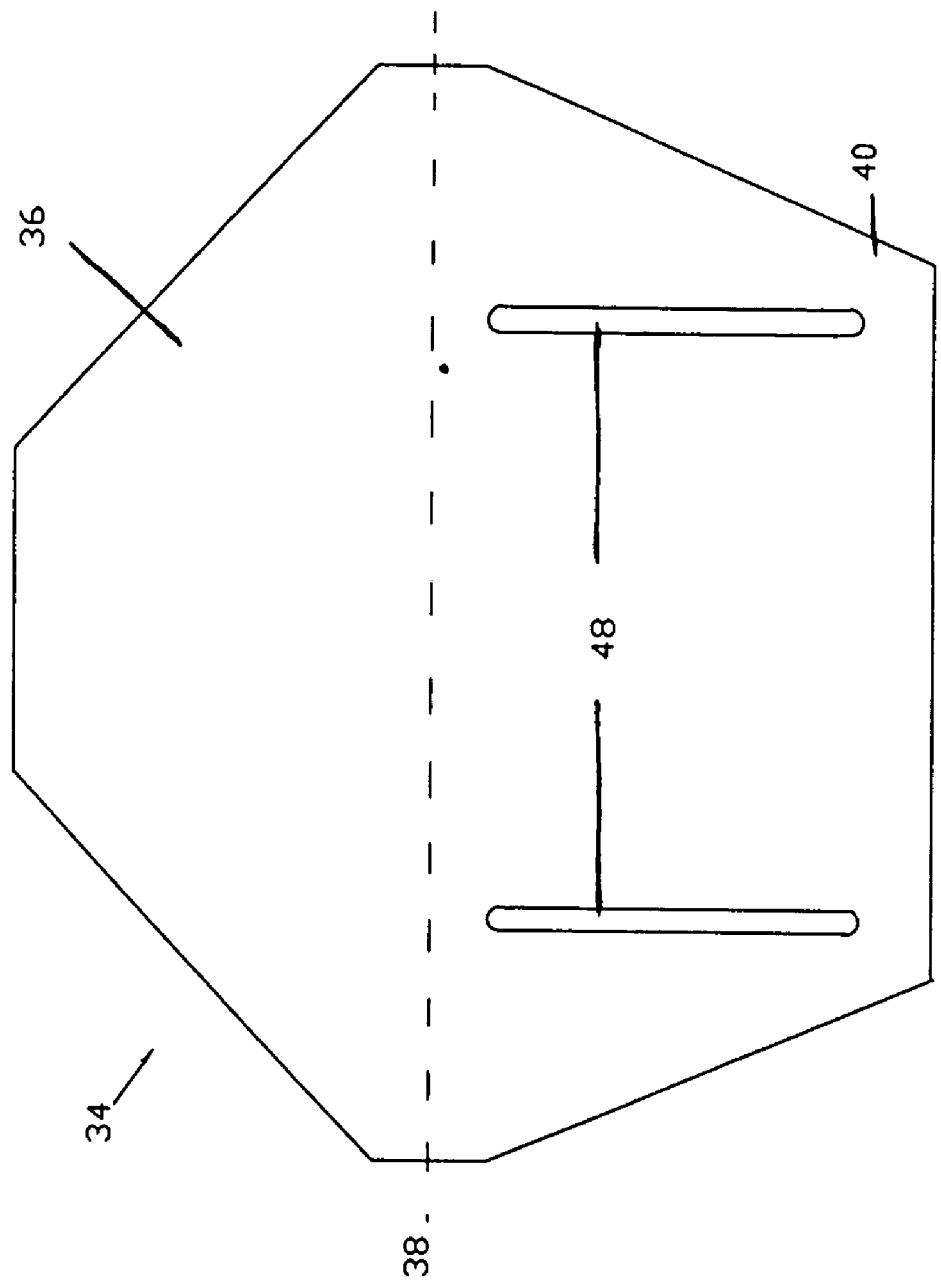
FIG. 23 is a plan view of the hinged plate of FIG. 20 showing the hinge axis with a dashed line.
Figure 24:
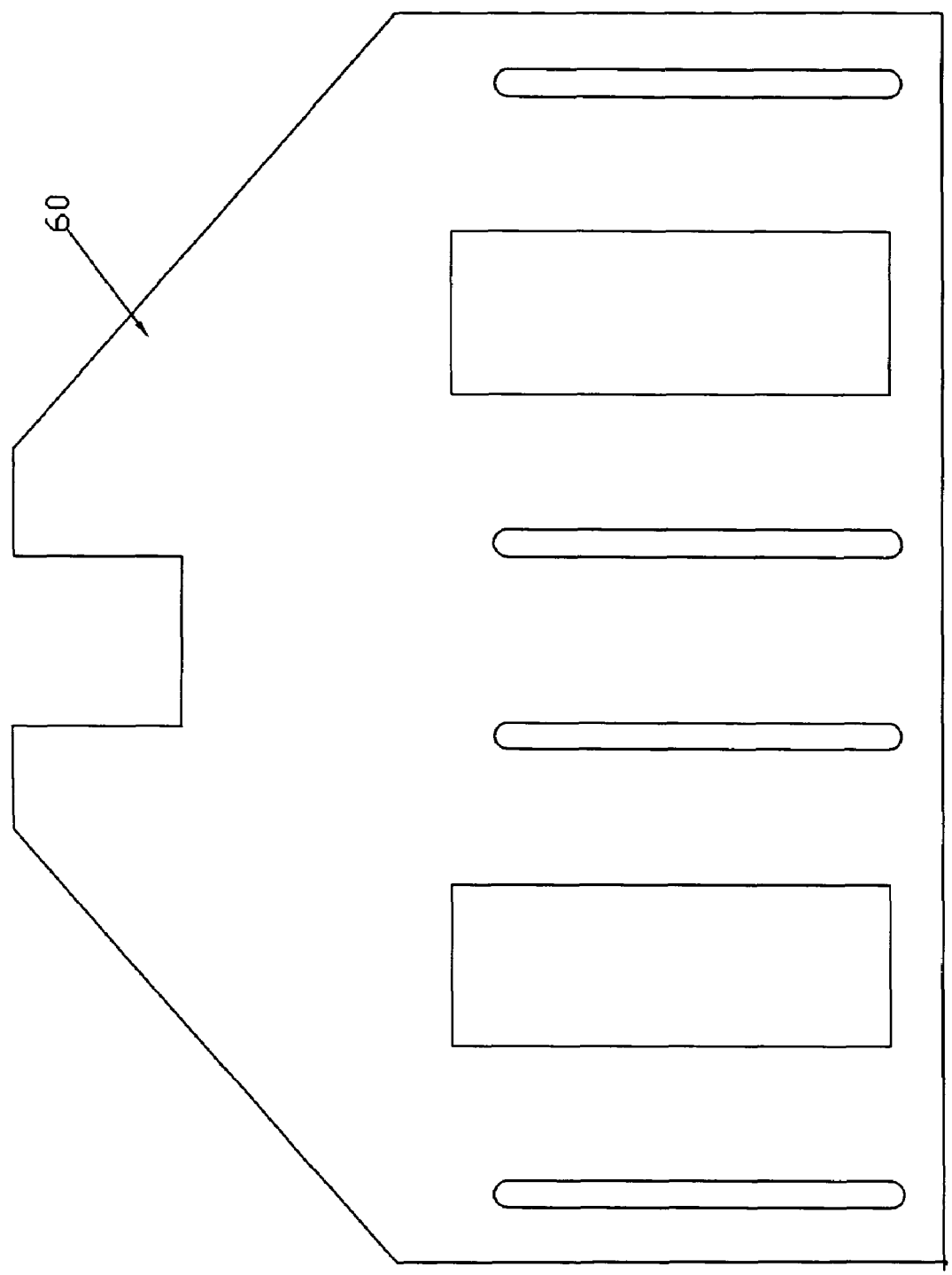
FIG. 24 is a plan view of the mounting bracket of FIG. 20.
Figure 25:
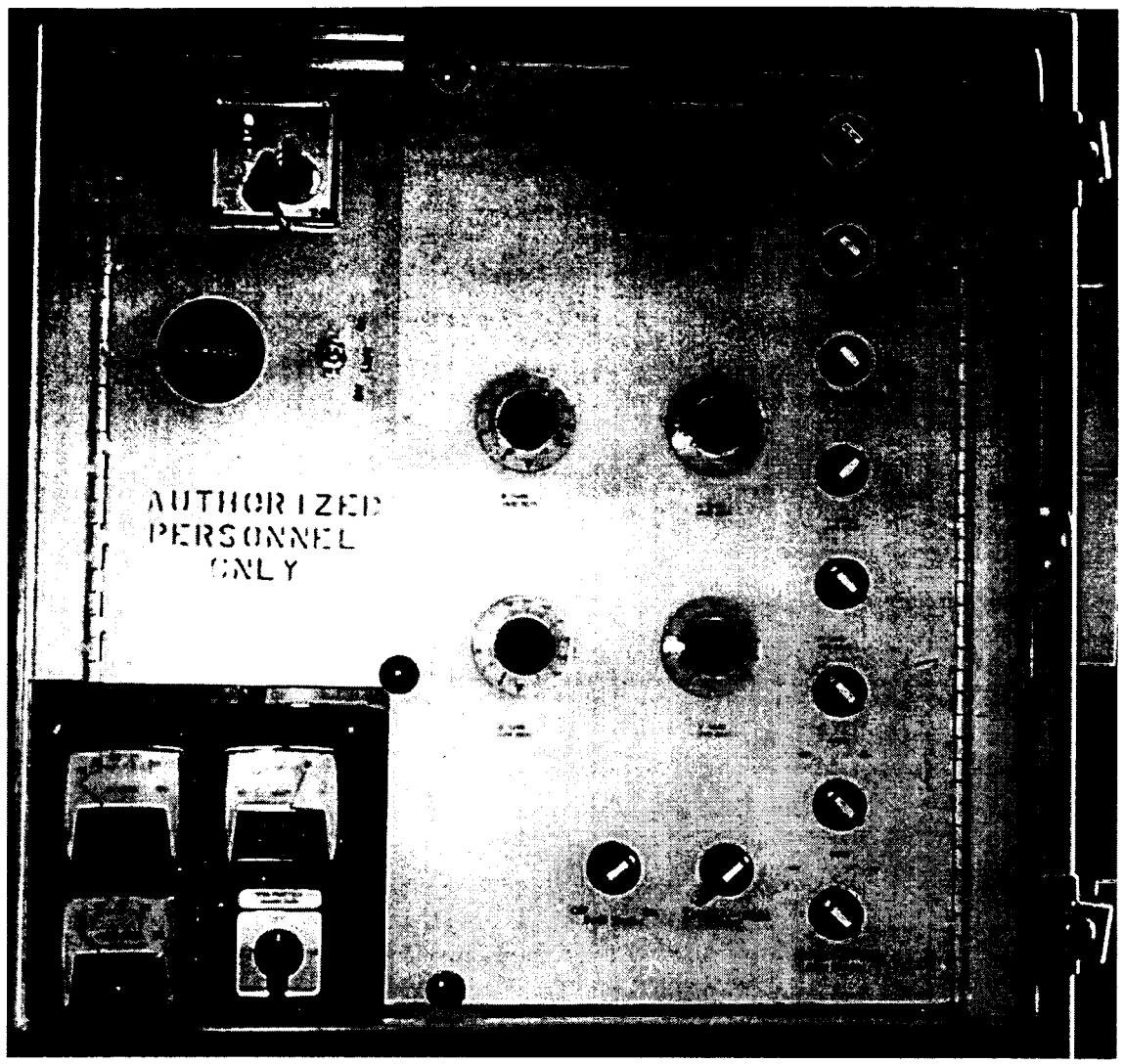
FIG. 25 is a perspective view of the control panel for the apparatus.
Figure 26:
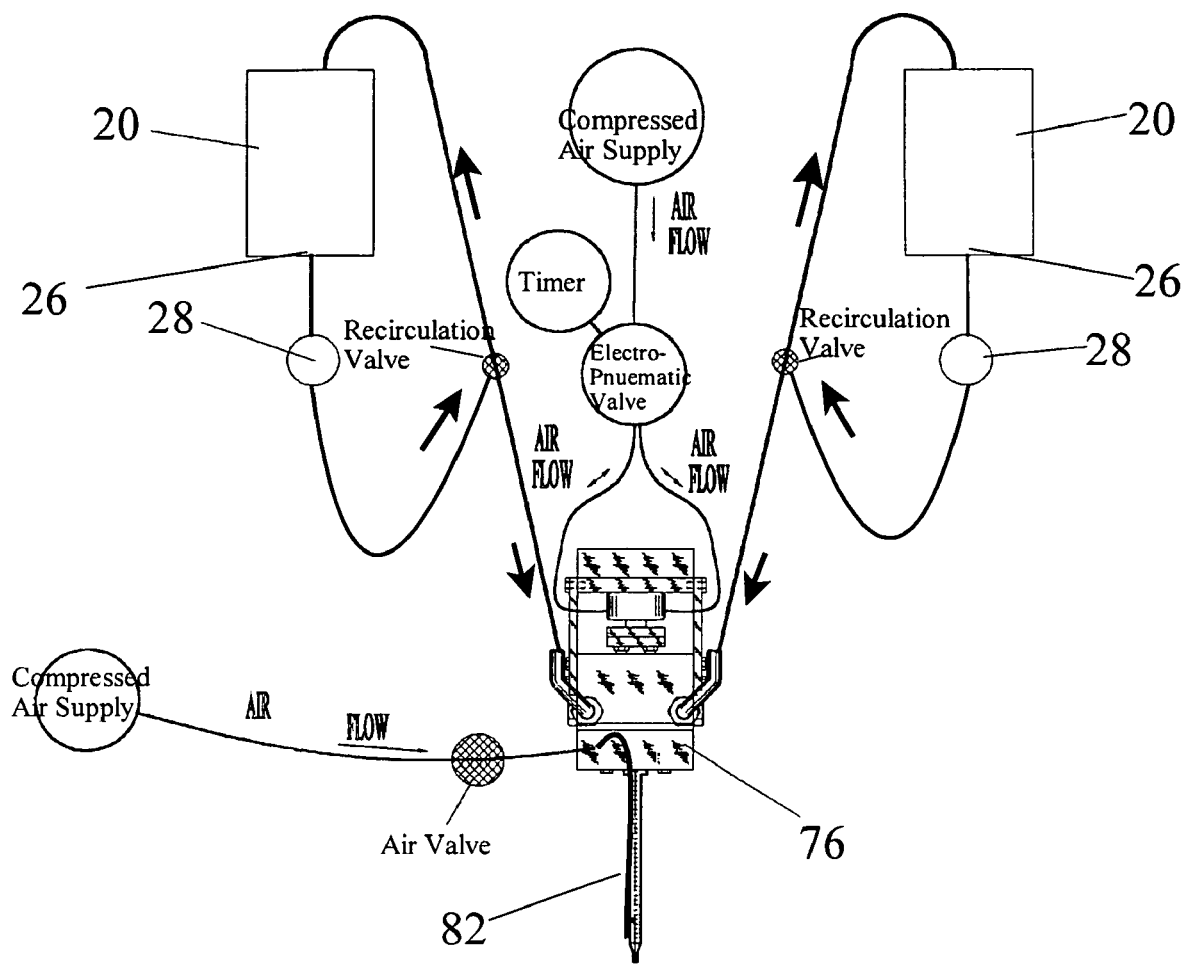
FIG. 26 is a block diagram of the apparatus for optimally mixing and applying a two part epoxy.
Figure 27:
FIG. 27 is an internal perspective view of a holding tank showing the auger feed, hydraulic motor housing, and exiting port.

FIGS. 13, 14, and 15 show the respective cross sections of the valving block 86, seal plate 96, and mixing block 83. The seal plate 96 fits and sandwiches between the valving block 86 and the mixing block 83 and provides the recesses necessary to hold and sandwich the aforementioned valving O-rings 95 in place. Alternative embodiments may utilize other forms for securing said O-rings 95 such as recesses in the valving block 86 or mixing block 83 and forego use of the seal plate 96 altogether. From the aforesaid figures, it is shown that each epoxy constituent compound enters the valving block 86 and flows through passages within the seal plate 96 into the mixing block 83 when said valves 92 are opened. Said compounds then exit through the static mixer adaptor 94 and into the static mixer 78 having the mixing chamber 80, thereafter exiting onto the work surface as a mixed compound.

The timer of the present art, preferably electronic, allows for an electrical pulse of preprogrammed pulsewidth to control the open and closed time of said valves 92 through said valve actuator 90 in order to provide a desired volume mix output. (For a preferred embodiment the timer is a model 365A manufactured by Automatic Timing & Controls of Lancaster, Pa.) That is, if the pressure and flow rate is controlled by the synchronous pumps 28, the amount of compound which is mixed and delivered through the static mixer 78 is simply a linear function of how long the compound valves 92 are left open. In a preferred embodiment said pulsewidth is programmable from 0.1 to 3 seconds but may be configured for shorter or longer user desired pulsewidths. When the operator pushes a switch to energize said timer, the electrical pulse from said timer opens or energizes the electric valve which supplies pressurized air to the air cylinder to open the valves 92 in the dispensing gun head 76. When said timer de-energizes or closes said electric valve, compressed air is transferred to the other side of said air cylinder to force said valves 92 into a closed position. In the preferred embodiment, any time that one side of the air cylinder is pressurized, said electric valve vents the other side to atmosphere. Those skilled in the art will appreciate that electrical timers are a staple item which are manufactured in many forms and use a variety of different technologies. The timer is commercially available and is claimed only in conjunction with the system described herein.

The valve actuator 90 is capable of providing positive force for opening and closing the compound valves 92. When the valve actuator 90 is pneumatic, two air flow hoses are provided to the pneumatic cylinder, typically a pancake type cylinder, to provide positive and negative force and movement upon the compound valves 92. The electric valve allows for one air flow hose to exhaust while the other hose is pressurized. Furthermore, in the preferred embodiment, the valve actuator 90 is spring loaded to provide a default closure of the compound valves 92 if necessary.

As aforesaid, the recirculation system typically comprises two or more hoses with inline valves which are attached with "T" fittings before the compound entrance holes 84 and feed unmixed compound back into the respective holding tanks 12. Recirculation ensures temperature control and prevents separation of the constituent compounds. As aforesaid, each recirculation hose contains its own recirculation valve which is capable of regulating, controlling, and directing said recirculation flow. In a preferred embodiment, said valves are manually closed prior to actuating said mixing head 76 in order to apply full pressure to the mixing head 76. Alternative embodiments incorporate recirculation valves which automatically close when said mixing head 76 is actuated.

In operation, the user places the exiting tube portion or open end 81 of the static mixer 78 into the area or volume which requires the epoxy mix. The user then, if desired, actuates the air spray 82 mounted near or on said mixing head 76 to clean the area onto which the epoxy is applied. When epoxy application is desired, the user triggers the timer via a switch. Upon triggering of the timer, an electrical pulse is created which actuates an electrically controlled pneumatic valve which allows compressed air to pressurize the compound valve 92 opening air line and exhausts to atmosphere the compound valve 92 closing air line. The compressed air thus supplied to the pneumatic valve actuator thereby opens the compound valves 92. When open, the compound valves 92 allow a predetermined volume of each compound to enter the mixing chamber 79 or static mixer 78. The compounds are then mixed within the static mixer 78 and mixing chamber 79 through the turbulent flow provided by said static mixer 78. Thereafter, the mixed compound exits the open end 81 of the static mixer 78 as an epoxy mixture. When not injecting an epoxy mix, the recirculation valves are opened in order to provide compound recirculation for optimum temperature and viscosity control.

The present art further incorporates a terrain drive 98 on each side of the carriage 100, each having solid rubber tires. Each terrain drive 98 may be lowered or raised via the action of a hydraulic cylinder 102. The terrain drives 98 are typically driven by hydraulic motors, although alternative embodiments may utilize other types of motors, and allow the carriage 100 to be driven when the drives are lowered. The carriage 100 further incorporates rail followers 104 on each side of the carriage center axis which may be lowered onto a railroad rail and follow said rail when the terrain drives 98 are moving the carriage 100. A unique feature of the present apparatus is the placement of a rail follower 104 near the center axis of the machine whereby the carriage 100 and apparatus 10 may be guided by a railroad rail mounted on or near the center of the railroad track plane.

From the foregoing description, those skilled in the art will appreciate that all objects of the present invention are realized. An apparatus and method for mixing and injecting or applying an epoxy blend has been shown and described. The apparatus provides quickly mixed, consistent, and convenient epoxy delivery, especially for railroad applications.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. An apparatus for mixing and injecting or applying a two or more part epoxy comprising:

two or more holding tanks each holding a an epoxy resin or an epoxy hardener component and having an exiting port and one or more cavities having a heat transferring liquid and one or more heating elements with said liquid, said heating elements capable of uniformly heating said resin or hardener to a temperature whereby viscosity is reduced yet said temperature is below a self hardening temperature; and two or more synchronously and variable ratio coupled pumps each having an intake port capable of suction feeding said resin or hardener and a discharge port and capable of positive pumping said resin or hardener through said discharge port on both an extension and a reflex stroke, each intake port connected with one of said holding tank exiting ports; and one or more hydraulic drive cylinders having a controlled hydraulic pressure connected with a first side of a hinged plate said hinged plate having a second side connected with said pumps and a hinge axis between said first and second side; and a dispensing and mixing head having two or more valves connected separately with said discharge ports whereby said components enter said dispensing and mixing head via the action of said pumps upon actuation of said dispensing and mixing head and are mixed and exit said dispensing and mixing head at an open end as a viscous blend; and one or more recirculating valves each connected with a fitting between said head and said discharge port and further connected with one or more of said holding tanks whereby when said recirculating valve is open recirculation into said holding tanks occurs and when said recirculating valve is closed, said dispensing or mixing head is pressurized and ready for use.

2. The apparatus for mixing and injecting or applying a two or more part epoxy as set forth in claim 1, said pumps each further comprising:

a cylinder and piston combination of substantially equal diameter, said piston having an attached connecting rod and a connecting rod external end extending external to said cylinder; and one or more intake check valves positioned to allow said resin or hardener to enter said cylinder through said intake port when said piston retracts away from said intake port; and one or more piston check valves positioned with said piston to allow said resin or hardener to flow through said piston and into said cylinder where said connecting rod attaches with said piston when said piston is forced toward said intake port; and said one or more check valves having a spring biasing said check valves against a valve seat, whereby said valve is positively closed when said resin or hardener is not flowing through said valve seat.

3. The apparatus for mixing and injecting or applying a two or more part epoxy as set forth in claim 2 said pumps each further comprising:

said piston check valves further positioned within said piston and said intake check valves further positioned within said intake port, whereby said piston check valve within said piston opens as said piston moves toward said intake port and said piston check valve within said piston closes as said piston moves away from said intake port and said intake check valve within said intake port opens as said piston moves away from said intake port and said intake check valve within said intake port closes as said piston moves toward said intake port, whereby said resin or hardener flows from said discharge port upon movement of said piston in either direction.

4. The apparatus for mixing and injecting or applying a two or more part epoxy as set forth in claim 3 further comprising:

said piston having an attached connecting rod and a connecting rod external end extending external to said cylinder; and said hydraulic drive cylinder having a displacement $d_1$ and connected with said first side a distance $L_1$ from said hinge axis; and one or more of said pumps slideably placed and secured upon said second side a distance $L_2$ from said hinge axis, whereby displacement $d_1$ of said drive causes connecting rod displacement $d_2$ substantially in a ratio:

$$d_2 = \frac{d_1}{L_1} * L_2$$

5. The apparatus for mixing and injecting or applying a two or more part epoxy as set forth in claim 4 said drive further comprising:

said hydraulic cylinder having an extension rod pivotably connected with said first side; and one or more limit switches mounted near said hinged plate and capable of sensing one or more positions of said hinged plate; and a hydraulic valve actuated by said limit switches whereby a hydraulic fluid flows into a first portion and out of a second portion of said hydraulic cylinder thereby causing said extension rod to extend and when directed by said limit switches allows said hydraulic fluid to flow out of a first portion and into a second portion of said hydraulic cylinder thereby causing said extension rod to retract.

6. The apparatus for mixing and injecting or applying a two or more part epoxy as set forth in claim 4 further comprising:

two or more slots on said second side of said hinged plate and two or more clevis's moveably attached with each of said slots respectively and each of said connecting rod external ends connected with one of said clevis's whereby said one or more pumps are each slideably placed and secured upon said second side and allow for variable ratio synchronous pumping.

7. The apparatus for mixing and injecting or applying a two or more part epoxy as set forth in claim 4 further comprising:

a hinged cradle having two or more pump rings and mounting brackets; and said cylinders attached with said pump rings and said pump rings pivotably attached with said mounting brackets; and said connecting rod external ends slideably connected with said second side of said hinged plate.

8. The apparatus for mixing and injecting or applying a two or more part epoxy as set forth in claim 1, one or more of said holding tanks further comprising:

one or more auger feeds positioned within said tanks in such a manner as to promote feeding of said viscous material into said exiting port.

9. The apparatus for mixing and injecting or applying a two or more part epoxy as set forth in claim 8, one or more of said holding tanks further comprising:

said one or more cavities within a base and substantially surrounding each of said holding tanks and having said heat transferring liquid attached with one or more of said tanks; and said heating element positioned within said cavity whereby heat is transferred to said heat transferring liquid and thereby uniformly heats said viscous material.

10. The apparatus for mixing and injecting or applying a two or more part epoxy as set forth in claim 9, said dispensing and mixing head further comprising:

two or more pin type compound valves connected with a valve actuator; and a valving block having two or more viscous compound entrance holes and two or more bores, said compound valves slidably engaged and sealed with said bores; and a mixing block having two or more compound chambers respectively sealingly engaged with said bores and two or more mixture exiting holes; and a static mixing chamber sealingly engaged with said mixture exiting holes and having said open end whereby said viscous blend exits said dispensing and mixing head when said valve actuator opens said compound valves.

11. The apparatus for mixing and injecting or applying a two or more part epoxy as set forth in claim 10, said dispensing and mixing head further comprising:

an air spray nozzle mounted on said dispensing and mixing head; and a compressed air supply and an air valve connected between said compressed air supply and said air spray nozzle, whereby a compressed air spray is provided upon actuation of said air valve.

12. The apparatus for mixing and injecting or applying a two or more part epoxy as set forth in claim 10, said dispensing and mixing head further comprising:

a seal plate between said valving block and said mixing block and having two or more recesses and two or more O-rings within said recesses and two or more passages communicating with said bores and said compound chambers respectively; and said mixing chamber further comprising a static mixer.

13. The apparatus for mixing and injecting or applying a two or more part epoxy as set forth in claim 10 further comprising:
   a carriage upon which said two or more holding tanks and said two or more synchronously coupled pumps are mounted; and
   one or more raisable and lowerable terrain drives mounted with said carriage; and
   one or more rail followers mounted with said carriage whereby said carriage is driven by said terrain drive when lowered and said rail followers cause said carriage to follow one or more railroad rails.

14. The apparatus for mixing and injecting or applying a two or more part epoxy as set forth in claim 1, said dispensing and mixing head further comprising:
   two or more pin type compound valves connected with a valve actuator; and
   a valving block having two or more viscous compound entrance holes and two or more bores, said compound valves slidably engaged and sealed with said bores; and
   a mixing block having two or more compound chambers respectively sealingly engaged with said bores and two or more mixture exiting holes; and
   a static mixing chamber sealingly engaged with said mixture exiting holes and having said open end whereby said viscous blend exits said dispensing and mixing head when said valve actuator opens said compound valves.

15. An apparatus for mixing and injecting or applying a two or more part epoxy viscous material comprising:
   two or more synchronously coupled pumps capable of pumping a viscous material each having an intake port capable of suction feeding said material and a discharge port; and
   a hinged plate having a first side, a second side, and a hinge axis between said first and second side, said pumps slideably connected with said second side; and
   said pumps comprising a cylinder and piston combination having substantially equal diameter and capable of positive pumping through said discharge port on both an extension and a reflex stroke, said piston having an attached connecting rod and a connecting rod external end extending external to said cylinder; and
   two or more check valves in said combination, said two or more check valves having a spring biasing said check valves against a valve seat, whereby said valve is positively closed when said viscous material is not flowing through said valve seat; and
   one of said check valves located within said piston and one of said check valves located within said intake port, whereby said check valve within said piston opens as said piston moves toward said intake port and said valve within said piston closes as said piston moves away from said intake port and said check valve within said intake port opens as said piston moves away from said intake port and said valve within said intake port closes as said piston moves toward said intake port, whereby said viscous material flows into said intake port and out said discharge port upon movement of said piston in either direction; and a dispensing and mixing head having two or more valves connected separately with said discharge ports whereby said viscous material components enter said dispensing and mixing head via the action of said pumps upon actuation of said dispensing and mixing head and are mixed and exit said dispensing and mixing head at an open end as a viscous blend; and
   one or more recirculating valves, each connected with a fitting between said head and said discharge port whereby when said recirculating valve is closed, said dispensing or mixing head is pressurized and ready for use.

16. The apparatus for mixing and injecting or applying a two or more part epoxy viscous material as set forth in claim 15 further comprising:
   two or more holding tanks each having said viscous material components and an exiting port connected with said intake ports of said pumps respectively and one or more cavities having a heat transferring liquid and one or more heating elements with said liquid said heating elements capable of uniformly heating said viscous material to a temperature whereby viscosity is reduced yet said temperature is below a self hardening temperature; and
   said one or more recirculating valves, each further connected with one or more of said holding tanks whereby when said recirculating valve is open recirculation into said holding tanks occurs.

17. An apparatus for mixing and injecting or applying a two or more part epoxy viscous material comprising:
   two or more holding tanks each having a viscous component and an exiting port and one or more auger feeds positioned within said tanks in such a manner as to promote feeding of said viscous component into said exiting port and one or more cavities substantially surrounding each of said tanks and having a heat transferring liquid and one or more heating elements whereby heat is transferred to said heat transferring liquid and thereby uniformly heats said viscous material; and
   two or more synchronously coupled pumps driven by one or more drives, each having an adjustable variable ratio of pumping displacement relative to the other pumps, and each pump having an intake port capable of suction feeding said material from said tanks and a discharge port, each intake port connected with one of said holding tank exiting ports; and
   said pumps each further comprising a cylinder and piston combination of substantially equal diameter, said piston having an attached connecting rod and a connecting rod external end extending external to said cylinder and a first normally biased spring loaded closed check valve within said piston and a second normally biased spring loaded closed check valve within said intake port, whereby said check valve within said piston opens as said piston moves toward said intake port and said check valve within said piston closes under said bias as said piston moves away from said intake port and said check valve within said intake port opens as said piston moves away from said intake port and said check valve within said intake port closes under said bias as said piston moves toward said intake port, whereby said viscous material flows from said discharge port upon movement of said piston in either direction; and
   a dispensing and mixing head connected with said discharge ports whereby said viscous material components enter said dispensing and mixing head via the action of said pumps upon actuation of said dispensing and mixing head and are mixed via a static mixer and exit said dispensing and mixing head at an open end as a viscous blend; and one or more recirculating valves each connected with a fitting between said head and said discharge port and further connected with one or more of said holding tanks whereby when said recirculating valve is open recirculation into said holding tanks occurs and when said recirculating valve is closed said dispensing or mixing head is pressurized and ready for use.

18. The apparatus for mixing and injecting or applying a two or more part epoxy viscous material as set forth in claim 17, said dispensing and mixing head further comprising:

two or more pin type compound valves connected with a valve actuator; and a valving block having two or more viscous compound entrance holes and two or more bores, said compound valves slidably engaged and sealed with said bores; and a mixing block having two or more compound chambers respectively sealingly engaged with said bores, said compound valves extending into said compound chambers when closed, and two or more mixture exiting holes; and said static mixer sealingly engaged with said mixture exiting holes and having said open end whereby said viscous material enters said compound entrance holes upon opening of said compound valves flows into said compound chambers and through said mixture exiting holes and into said static mixer and thereafter exits said dispensing and mixing head as a viscous material blend.

* * * * *